US012122652B1

(12) United States Patent
Paschall et al.
(10) Patent No.: US 12,122,652 B1
(45) Date of Patent: Oct. 22, 2024

(54) PAYLOAD TRANSPORTING AUTONOMOUS VEHICLE FOR UNSTRUCTURED HUMAN COLLABORATIVE ENVIRONMENTS

(71) Applicant: Amazon Technologies, Inc., Seattle, WA (US)

(72) Inventors: Stephen Charles Paschall, Cambridge, MA (US); Dincer Bozkaya, Andover, MA (US)

(73) Assignee: Amazon Technologies, Inc., Seattle, WA (US)

( * ) Notice: Subject to any disclaimer, the term of this patent is extended or adjusted under 35 U.S.C. 154(b) by 969 days.

(21) Appl. No.: 17/036,716

(22) Filed: Sep. 29, 2020

(51) Int. Cl.
*B66F 9/065* (2006.01)
*B66F 9/06* (2006.01)

(52) U.S. Cl.
CPC .............. *B66F 9/065* (2013.01); *B66F 9/063* (2013.01)

(58) Field of Classification Search
CPC ................................. B66F 9/063; B66F 9/065
See application file for complete search history.

(56) References Cited

U.S. PATENT DOCUMENTS 4,565,039 A * 1/1986 Oguro ..................... E02D 27/44 267/140.5
7,152,882 B2 * 12/2006 Tokumaru .............. B62D 57/04 180/907
7,850,413 B2 * 12/2010 Fontana .................. B66F 9/063 414/331.14
8,280,547 B2 * 10/2012 D'Andrea .............. G05B 13/00 700/214
9,586,510 B2 * 3/2017 Colantonio ............. B66F 9/065
9,824,328 B2 * 11/2017 Lecky .................. G06Q 10/087
9,890,025 B2 * 2/2018 Colantonio ............. B66F 9/063
9,928,698 B2 * 3/2018 Farrow .................. G06Q 10/00
10,209,682 B1 * 2/2019 Hebert .................... B66F 9/063
10,328,836 B2 * 6/2019 Purwin ................... B66F 9/063
11,167,923 B2 * 11/2021 Sabhnani ................. B65G 1/10
2016/0167557 A1 * 6/2016 Mecklinger ............. B66F 9/063 414/812
2019/0062057 A1 * 2/2019 Cantor ................. G05D 1/0297
2019/0381843 A1 * 12/2019 Miyamoto ............... B60D 1/36
2020/0254607 A1 * 8/2020 Ejstrup Hansen ...... B66F 9/063

* cited by examiner

*Primary Examiner* — Seahee Hong
(74) *Attorney, Agent, or Firm* — Athorus, PLLC

(57) ABSTRACT

Described are automated guided vehicles (AGVs) that can autonomously engage and transport a payload carrier in a human collaborative materials handling facility environment. Embodiments of the present disclosure can be deployed in various materials handling facilities (e.g., a sortation facility, a cross dock center, a fulfillment center, a warehouse, a delivery center, etc.) to facilitate efficient and automated transport of a payload carrier, such as a cart, alongside human workers in unstructured, collaborative environments. Further, the exemplary autonomous vehicle of the present disclosure can engage payload carriers (e.g., carts, etc.) in various configurations and orientations to facilitate multiple modes of transport.

19 Claims, 20 Drawing Sheets

PAYLOAD TRANSPORTING AUTONOMOUS VEHICLE FOR UNSTRUCTURED HUMAN COLLABORATIVE ENVIRONMENTS

BACKGROUND

Handling items in materials handling facilities can often be difficult and time consuming, with many tasks and processes typically requiring manual handling. In such circumstances, automation may be sought to improve existing processes and make them more efficient. Automating manual processes can often provide significant benefits. However, the usefulness of automated vehicles, such as automated guided vehicles (AGVs), in such facilities may be limited. Often, AGVs operating in such a facility require separation from the people working in the facility and are typically limited to a single specific task.

DETAILED DESCRIPTION

Figure 1A:
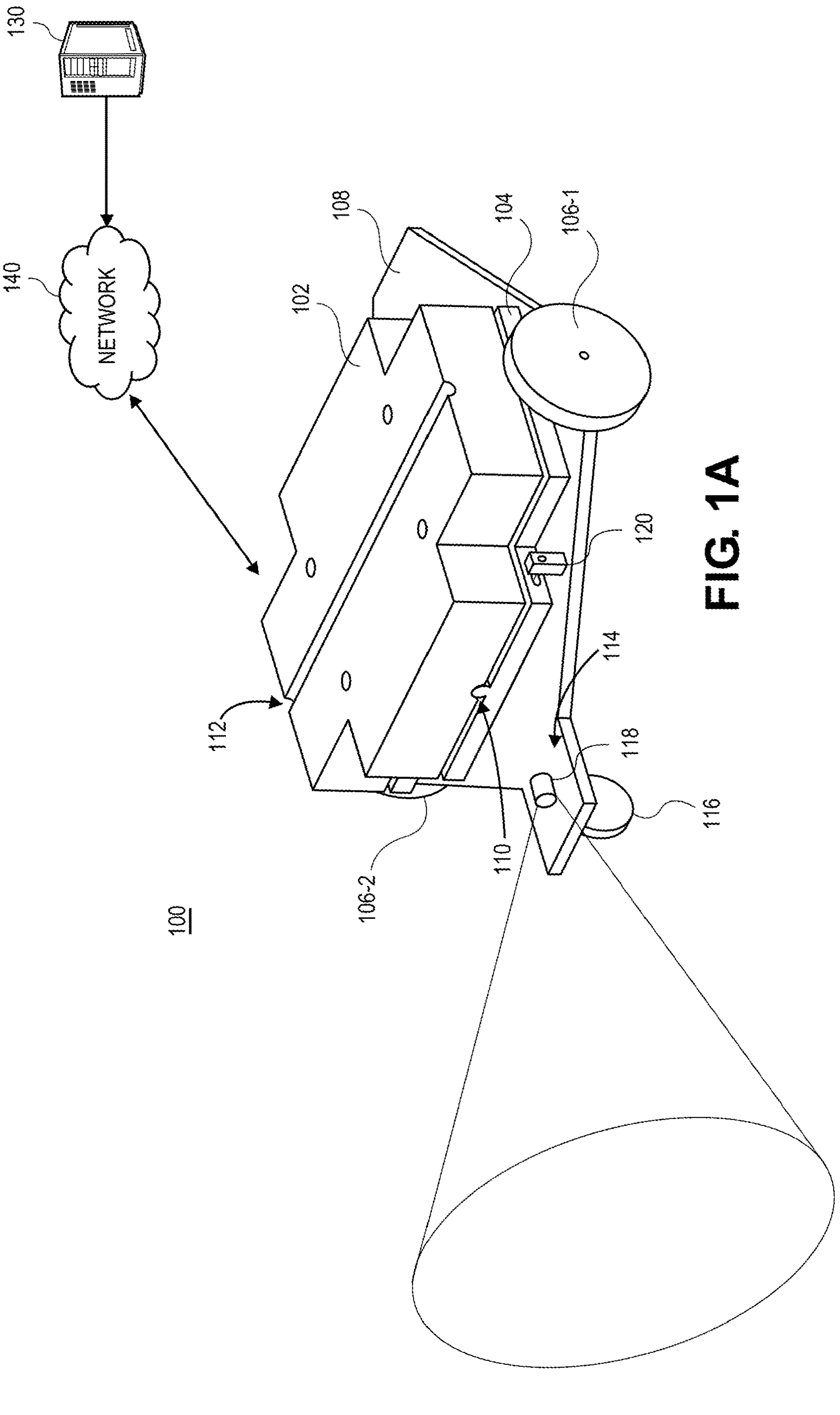
FIGS. 1A-1C are illustrations of an exemplary autonomous vehicle, in accordance with embodiments of the present disclosure.

As is set forth in greater detail below, embodiments of the present disclosure are generally directed to an autonomous vehicle, such as an automated guided vehicle (AGV), that can autonomously engage and transport a payload carrier in a human collaborative materials handling facility environment. Embodiments of the present disclosure can be deployed in various materials handling facilities (e.g., a sortation facility, a cross dock center, a fulfillment center, a warehouse, a delivery center, etc.) to facilitate efficient and automated transport of a payload carrier, such as a cart, alongside human workers in unstructured, collaborative environments. Further, the exemplary autonomous vehicle of the present disclosure can engage payload carriers (e.g., carts, etc.) in various configurations and orientations to facilitate multiple modes of transport. Preferably, the exemplary autonomous vehicle is sized and dimensioned to travel under (e.g., tunnel below) the payload carriers, rotate 360 beneath the payload carriers, and engage the payload carriers from beneath the payload carriers. This can facilitate efficient maneuvering and positioning of the autonomous vehicle (e.g., changing an orientation of the autonomous vehicle while remaining beneath and within the footprint of the payload carrier), as well as facilitating efficient arrangement and organization of payload carriers, as the exemplary autonomous vehicle may require less space to maneuver and engage the payload carriers when compared to currently employed systems.

Embodiments of the present disclosure can provide an exemplary automated vehicle configured to operate in a human collaborative environment in materials handling facilities (e.g., a sortation facility, a cross dock center, a fulfillment center, a warehouse, a delivery center, etc.) to autonomously engage and transport payloads. According to certain aspects, the exemplary autonomous vehicles can include, for example, a chassis having drive wheels, a lift table, a mounting block, an engagement plate, and a plurality of sensors. In operation, the autonomous vehicle can position itself beneath a payload carrier (e.g., a cart, etc.), and the lift table can be raised such that the engagement plate engages a base or undercarriage of the payload carrier. According to certain aspects of the present disclosure, the engagement plate can include various engagement mechanisms to engage an engagement member disposed on the base or undercarriage of the payload carrier. Additionally, the engagement of the engagement mechanism of the engagement plate with the engagement member can provide a pivot joint to facilitate relative movement between the payload carrier and the autonomous vehicle. Additional pivot joints may also be provided (e.g., between the lift table and the engagement plate, between the engagement plate and the payload carrier, between the engagement plate and the chassis, between the lift table and the chassis, between the lift table and the mounting block, between the engagement plate and the mounting block, etc.) to facilitate additional relative degrees of freedom of movement. The relative freedom of movement between the autonomous vehicle and the payload carrier provided by the one or more pivot joints can, for example, facilitate providing traction to the drive wheels, operation of the autonomous vehicle over uneven floors (e.g., bumps, cracks, etc.), increasing stability when accelerating and/or decelerating.

According to embodiments of the present disclosure, the sensors can provide sensor information to facilitate operation of the autonomous vehicle in the human collaborative environment. Preferably, the chassis can include a protrusion configured to extend beyond a periphery of an engaged payload carrier, and the plurality of sensors can be disposed on the protrusion of the chassis so as to extend beyond the periphery of an engaged payload carrier such that interference of components of the payload carrier with the field of view of the sensors is decreased. Accordingly, arranging the sensors in such a manner may increase the field of view of the sensors and decrease the blind spots of the sensors that may be presented by occlusions from components of the payload carrier. Alternatively and/or in addition, the chassis can include an articulating arm, and the sensors can be disposed on the articulating arm such that the relative position and orientation of the sensors can be adjusted in view of the engaged payload carrier and the configuration and/or orientation of the engaged payload carrier relative to the autonomous vehicle. According to other aspects, the sensors can be disposed on the sides (e.g., positioned toward the front of the autonomous vehicle, positioned toward the rear of the autonomous vehicle, etc.) of the autonomous vehicle to avoid occlusions that may be presented by the payload carrier. Additionally, the sensors may be positioned in any configuration in view of the design and configuration of the payload carrier with which the autonomous vehicle may engage to avoid occlusions and seek to maximize field of view.

According to embodiments of the present disclosure, the exemplary autonomous vehicle can provide multiple modes of transport of the payload carrier. For example, the autonomous vehicle can engage the payload carrier and lift the payload carrier off the ground (e.g., via the lift table). In this mode of transport, the autonomous vehicle may be fully supporting the entire load of the payload and pay load may be transported as the payload carrier is raised off the ground and fully supported by the autonomous vehicle. In another mode of transport, the autonomous vehicle can partially lift the payload carrier off the ground (e.g., portions of the payload carrier may be in contact with the ground while other portions of the payload carrier are lifted off the ground), and the payload may be transported by the autonomous vehicle in a towing/dragging arrangement. In yet another mode of transport, the autonomous vehicle may partially support the payload such that a proportion of the load of the payload is transferred to and supported by the autonomous vehicle while the payload carrier remains in full in contact with the ground. In this arrangement, the proportion of the payload supported by the autonomous vehicle can provide improved traction at the drive wheels of the autonomous vehicle (e.g., to facilitate acceleration and deceleration, etc.) while allowing transport of the payload carrier while it remains in full contact with the ground.

The various modes of transport may be implemented in connection with different configurations and/or orientations of the autonomous vehicle relative to the payload carrier and to facilitate different transport tasks. For example, in implementations where the footprint of the payload carrier is substantially rectangular, it may be preferable to transport the payload in different orientations based on the maneuver being performed. For example, for higher speed maneuvers along longer distances, it may be preferable to transport the payload carrier in a direction parallel to the longitudinal direction (e.g., shorter edge forward) of the payload carrier. Additionally, for other maneuvers (e.g., lower speed, precision maneuvers, etc.) it may be preferable to transport the payload carrier in a direction that is parallel to the transverse direction (e.g., longer edge forward) of the payload carrier.

Accordingly, in implementations where it may be preferable to transport the payload carrier in a longitudinal direction of the payload carrier, the autonomous vehicle may position itself closer to one of the shorter edges of the payload carrier. In this configuration, the lift table may be raised such that the engagement plate can engage an engagement member disposed on the base or undercarriage of the payload carrier. According to certain aspects of the present disclosure, the lift table may be raised such that ground contacting supports of the payload carrier disposed proximate to the position of the engaged autonomous vehicle may be raised off the ground, and the payload is transported in a towing/dragging arrangement. Alternatively and/or in addition, the lift table may be raised such that a portion of the autonomous vehicle bears a proportion of the load of the payload to provide traction to the drive wheels to facilitate transport of the payload while the ground contacting supports of the payload carrier remain on the ground. According to yet another aspect, based on the dimensions of the payload carrier, the lift table may be raised such that the payload carrier is fully raised off the ground and fully supported by the autonomous vehicle.

Alternatively and/or in addition, in implementations where it may be preferable to transport the payload carrier in a transverse direction of the payload carrier, the autonomous vehicle may position itself centered under the payload carrier. For example, in connection with a rectangular payload carrier, the autonomous vehicle can be centered in both relative to the transverse and longitudinal dimensions of the payload carrier. Alternatively, the autonomous vehicle can be centered relative to the transverse dimension of the payload or the autonomous vehicle can be centered relative to the longitudinal dimension of the payload. In this configuration, the lift table may be raised such that the engagement plate can engage the base or undercarriage of the payload carrier. According to certain aspects of the present disclosure, the lift table may be raised such that a portion of the autonomous vehicle supports a proportion of the payload to provide traction to the drive wheels to facilitate transport of the payload while the ground contacting supports of the payload carrier remain on the ground. Alternatively and/or in addition, the lift table may be raised such that the ground contacting supports of the payload carrier are raised off the ground and the entire load of the payload is supported by the autonomous vehicle. According to yet another aspect, based on the dimensions of the payload carrier, the lift table may be raised such that ground contacting supports of the payload carrier disposed proximate to the position of the engaged autonomous vehicle may be raised off the ground, and the payload is transported in a towing/dragging arrangement.

Figure 1B:
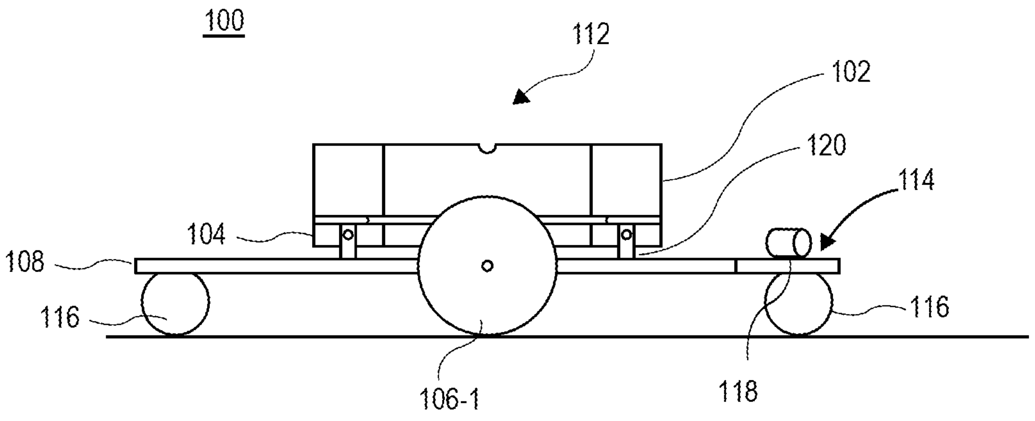
Figure 1C:
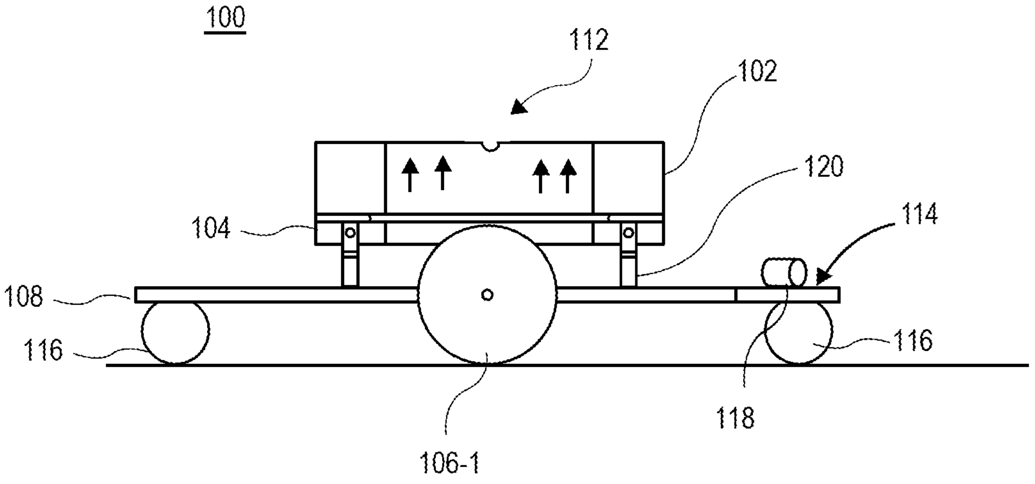

FIGS. 1A, 1B, and 1C are illustrations of an exemplary autonomous vehicle 100, according to embodiments of the present disclosure. FIG. 1A shows a perspective view of autonomous vehicle 100, while FIGS. 1B and 1C show a side view of autonomous vehicle 100. Autonomous vehicle 100 can operate in various materials handling facilities (e.g., a sortation facility, a cross dock center, a fulfillment center, a warehouse, a delivery center, etc.) to facilitate efficient and automated transport of a payload carrier, such as a cart, alongside human workers in unstructured, collaborative environments.

As shown in FIGS. 1A, 1B, and 1C, autonomous vehicle 100 can include chassis 108, to which lift table 102 with engagement mechanism 112, mounting block 104, drive wheels 106-1 and 106-2, pivot roll joint 110, caster wheel 116, sensors 118, and lift supports 120 may be coupled. Additionally, chassis 108 may include extending portion 114, on which sensors 118 may be mounted. According to certain aspects, chassis 108 may include a split chassis so as to facilitate ground contact of caster wheel 116 and drive wheels 106. Further, autonomous vehicle 100 may access and communicate with server 130 (or other computer systems) via network 140. For example, network 140 can include any wired or wireless network (e.g., cellular, satellite, Bluetooth, Wi-Fi, etc.) that can facilitate communications between autonomous vehicle 100 and server 130. Server 130 can transmit data and other information, including one or more instructions and/or commands to autonomous vehicle 100 to facilitate operation of autonomous vehicle 100. For example, server 130 can provide autonomous vehicle 130 with transport instructions, an origin location, a destination location, a payload pickup location, any waypoints or stopovers, a planned route, an objective function, etc.

Figure 13A:
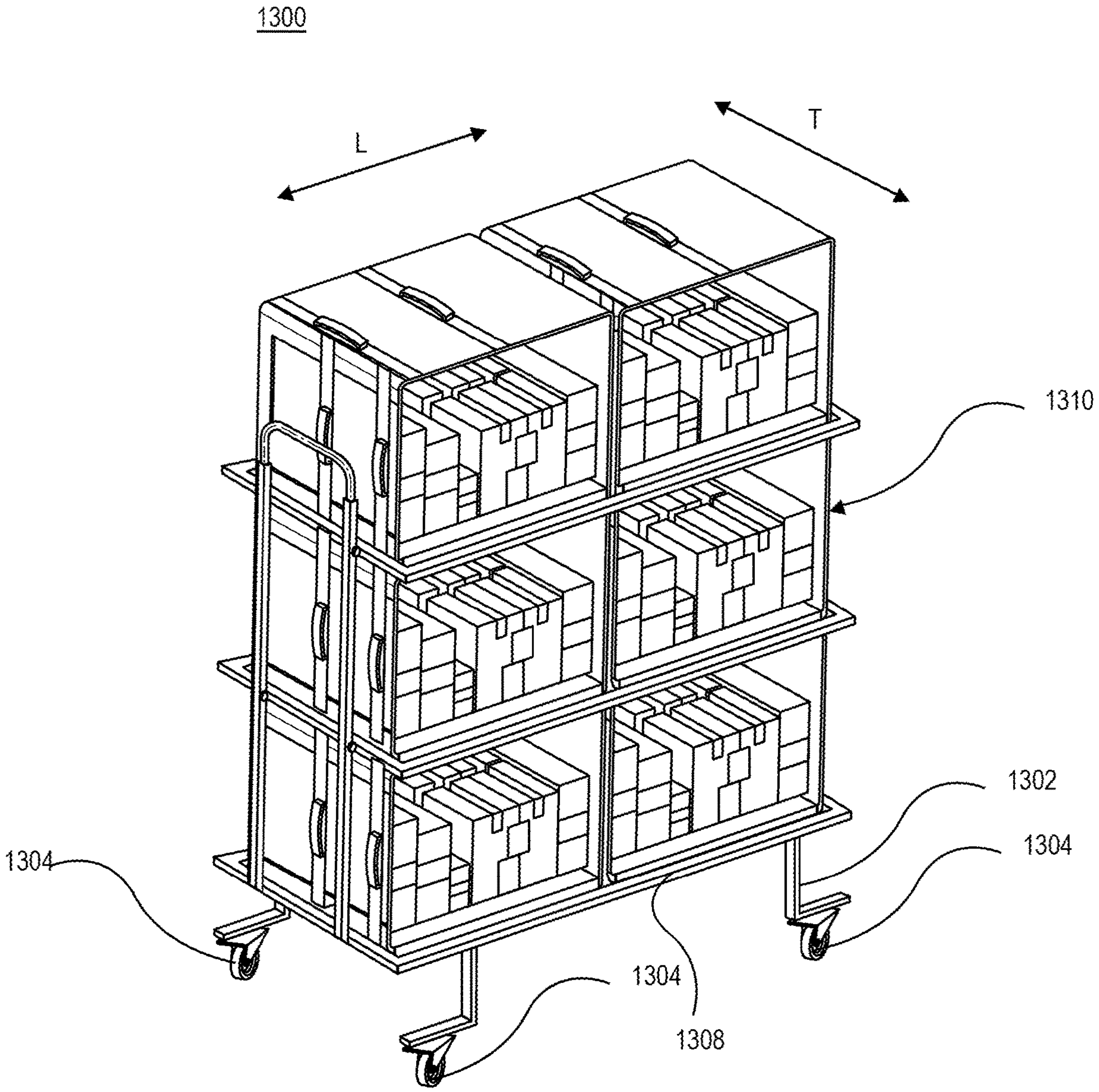
FIGS. 13A and 13B are illustrations of exemplary payload carriers, in accordance with embodiments of the present disclosure.
Figure 13B:
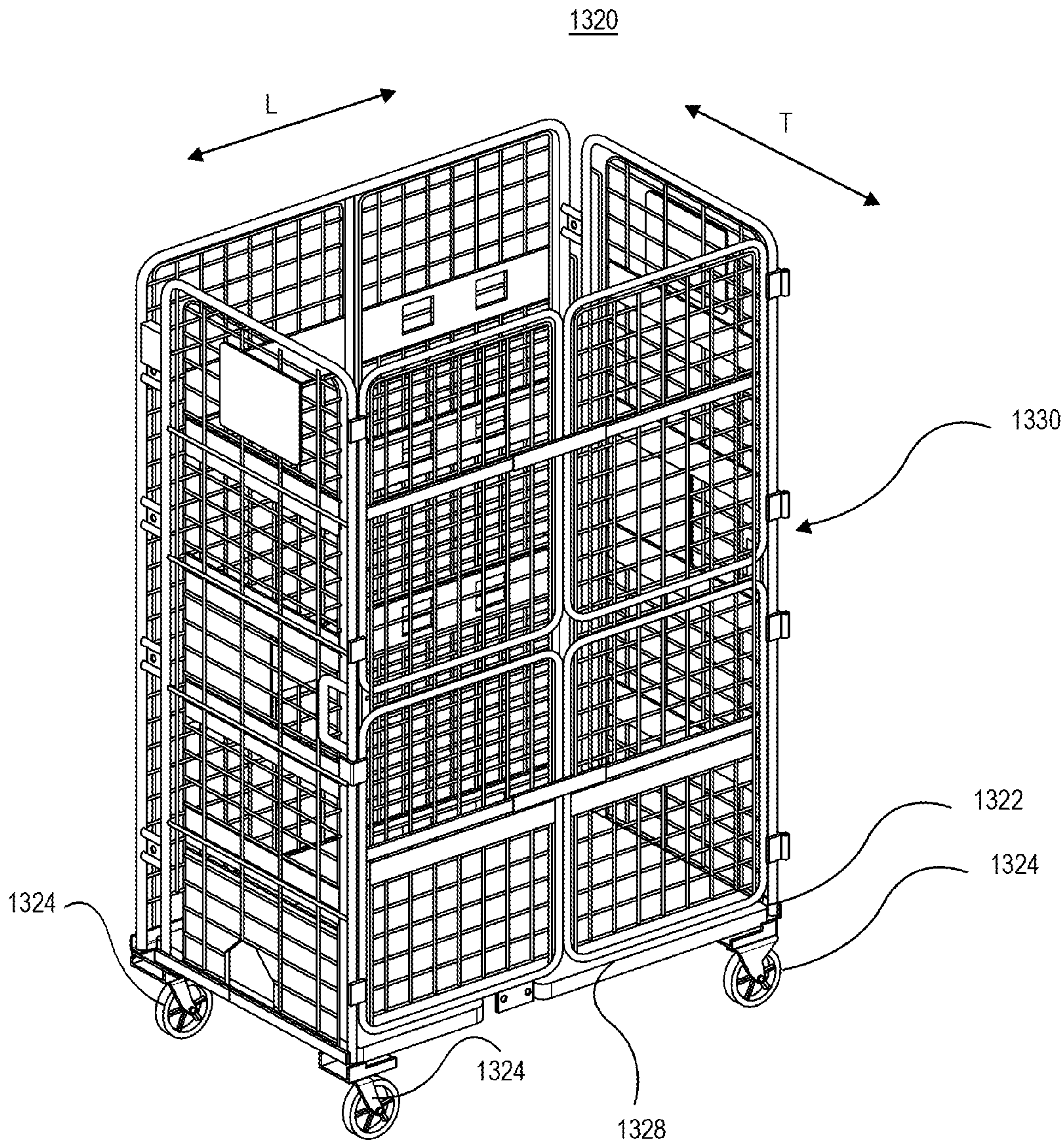

According to an embodiment of the present disclosure, autonomous vehicle 100 can engage and disengage a payload carrier, such as the carts shown and described in FIGS. 13A and 13B, via movement of lift table 102 and engagement mechanism 112 between an engaged position and a disengaged position. For example, autonomous vehicle 100 can be positioned beneath the payload carrier and lift table 102 and engagement mechanism 112 can be raised via lift supports 120 to engage an undercarriage, bottom, or base portion of the payload carrier. Further, based on the type of transport, configuration of engagement, etc., lift table 102 may be raised to a plurality of different heights. For example, where the payload is to be fully lifted and/or partially lifted, lift table 102 may be raised to a height higher than engagements where the payload carrier remains in contact with the ground surface.

Conversely, to disengage the payload carrier, lift table 102 and engagement mechanism 112 can be lowered, via lift supports 120, from any of the raised engaged positions to disengage autonomous vehicle 100 from the payload carrier. According to certain aspects of the present disclosure, lift supports 120 can include motors (e.g., servomotor, stepper motor, etc.), actuators (e.g., linear, rotary, etc.), pneumatics, a worm screw arrangement, hydraulics, linkages, gears, belts, or various other configurations or arrangements to raise and lower lift table 102 between the various engaged raised positions and a disengaged lowered position. FIG. 1C shows lift table 102 and engagement mechanism 112 in an exemplary raised (e.g., engaged) position, and FIGS. 1A and 1B show lift table 102 and engagement mechanism 112 in a lowered (e.g., disengaged) position. Further, although FIGS. 1A, 1B, and 1C show engagement mechanism 112 as being incorporated into lift table 102, according to other embodiments of the present disclosure, autonomous vehicle 100 may, as shown and described in connection with FIGS. 8A-8C and 9A-9C, include a separate engagement plate, which can include engagement member 112.

According to certain aspects, the base or undercarriage of the payload carrier may include an engagement member with which engagement mechanism 112 may engage to provide a releasable engagement of autonomous vehicle 100 with the payload carrier. Additionally, the engagement of engagement mechanism 112 with the engagement member of the payload carrier may provide a pivot joint to provide relative movement between autonomous vehicle 100 and the engaged payload carrier about an axis transverse to autonomous vehicle 100. For example, a pivot joint provided by the engagement of engagement mechanism 112 with an engagement member of the payload carrier can provide relative rotational movement about the pitch (e.g., transverse) axis. As shown in FIG. 1A, autonomous vehicle 100 can also include a pivot roll joint 110. According to certain aspects, pivot roll joint 110 can provide relative rotational movement about the roll (e.g., longitudinal) axis of autonomous vehicle 100. The relative movements provided by pivot roll joint 110 and the pivot pitch joint formed by the engagement of engagement mechanism 112 and an engagement member of the payload carrier can facilitate autonomous vehicle 100 to transport a payload over uneven floors, shifts in the load resulting from acceleration and deceleration of autonomous vehicle 100, increased traction to drive wheels 106, etc. For example, the one or more pivot joints (e.g., pivot roll joint 110 and pivot pitch joint formed by engagement of engagement mechanism 112 and an engagement member of the payload carrier) can permit relative motion to facilitate that both drive wheels 106 remain in contact with the ground surface, even over uneven and broken ground surfaces (e.g., bumps, cracks, uneven floors, etc.). Additionally, the pitch pivot joint can facilitate at least one caster wheel 116 also remaining in contact with the ground surface, to provide further stability to autonomous vehicle 100. Further, the pitch pivot joint can compensate for moments created by acceleration and/or deceleration of autonomous vehicle 100, by facilitating shifts in the center of gravity of the load (e.g., between drive wheels 106 and caster wheels 116, etc.) to provide increased stability of autonomous vehicle 100 during transport of a payload. A pitch joint formed by the engagement of engagement mechanism 112 and an engagement member of the payload carrier is discussed in further detail in connection with FIGS. 8A-8C, 9A-9C, 10A, 10B, 11A, and 11C.

Additionally, sensor 118 can detect and obtain information and data regarding the operating environment to facilitate autonomous operation of autonomous vehicle 100 in a collaborative materials handling facility environment. An exemplary collaborative materials handling facility operating environment in which autonomous vehicle 100 may be deployed is described in further detail in connection with FIG. 14. According to certain aspects of the present disclosure, sensor 118 may include one or more sensors, such as imaging sensors, LIDAR or other laser sensors, radar, inclinometers, accelerometers, gyroscopes, speed sensors, thermal sensors, compasses, etc., which may obtain information and/or data regarding the operating environment to facilitate operation (e.g., navigation, transport of payloads, obstacle avoidance, etc.) of autonomous vehicle 100 in the operating environment. Additionally, autonomous vehicle 100 can include sensors (e.g., load sensors, etc.) coupled to lift table 102 such that autonomous vehicle 100 can detect certain parameters associated with the payload to be transported. For example, autonomous vehicle 100 may obtain sensor information from one or more sensors (e.g., load sensors, etc.) to determine certain parameters (e.g., center of gravity, weight, mass, etc.) associated with the payload. Based on the parameters, operation of autonomous vehicle 100 can be customized to dynamically adjust and/or compensate (e.g., maneuvering, accelerating, decelerating, etc.) for the characteristics of the payload.

Figure 2:
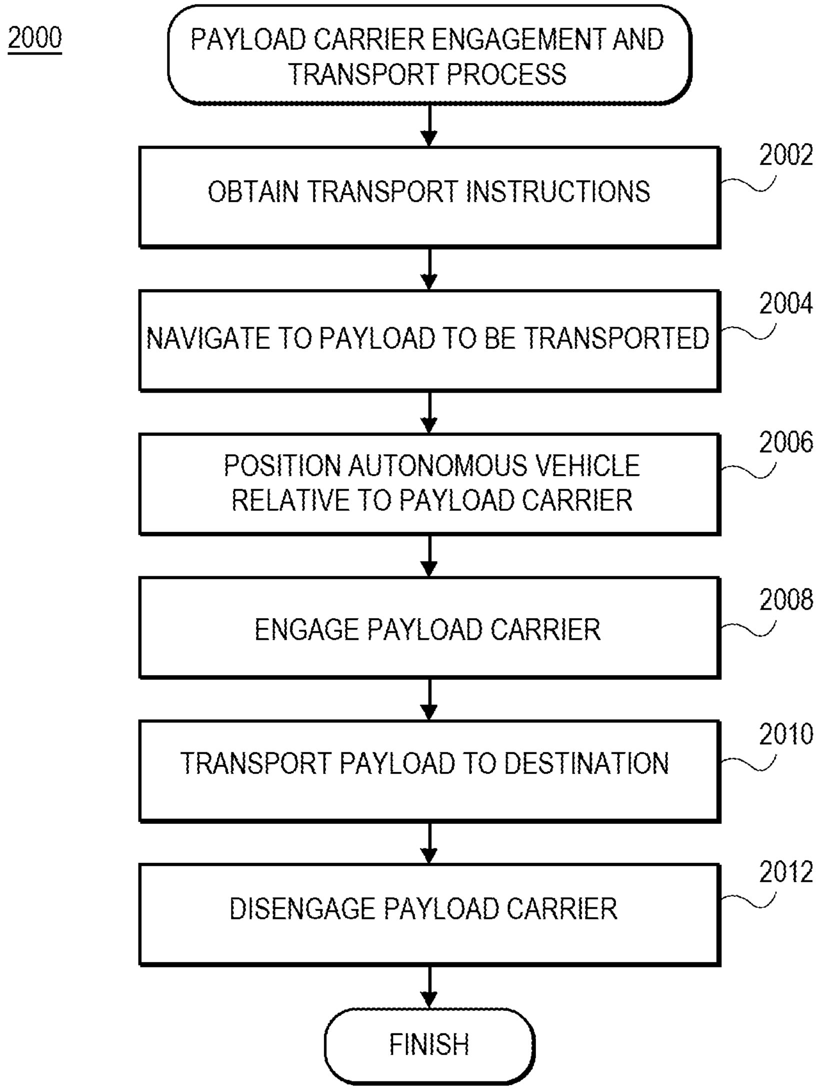
FIG. 2 is a flow diagram of an exemplary process for transporting a payload carrier, in accordance with embodiments of the present disclosure.

FIG. 2 is a flow diagram of an exemplary process 2000 for transporting a payload carrier, according to embodiments of the present disclosure. Process 2000 may be performed by an autonomous vehicle (e.g., autonomous vehicle 100) operating at a materials handling facility (e.g., a sortation facility, a cross dock center, a fulfillment center, a warehouse, a delivery center, etc.) to facilitate efficient and automated transport of a payload carrier, such as a cart, alongside human workers in an unstructured, collaborative environment.

As shown in FIG. 2, process 2000 can begin at step 2002 upon receipt of instructions to transport a payload. For example, transport instructions may be received by an autonomous vehicle (e.g., autonomous vehicle 100) from a computing system (e.g., server 130) via a network (e.g., network 140). The payload carrier may be a cart carrying a payload that is to be transported within a materials handling facility, and the transport instructions may include certain data and/or information such as the location of the payload to be transported, parameters and/or characteristics associated with the payload and/or payload carrier (e.g., cart type, cart dimensions, mass, weight, shape of payload carrier footprint, center of gravity, type of cart, etc.), the destination of the payload, the type of transport (e.g., high-speed transport, staging transport, payload carrier raised off the ground, payload carrier towed, direction/orientation of the transport—longitudinal, transverse, etc.), the route to be used during the transport, etc.

Figure 4A:
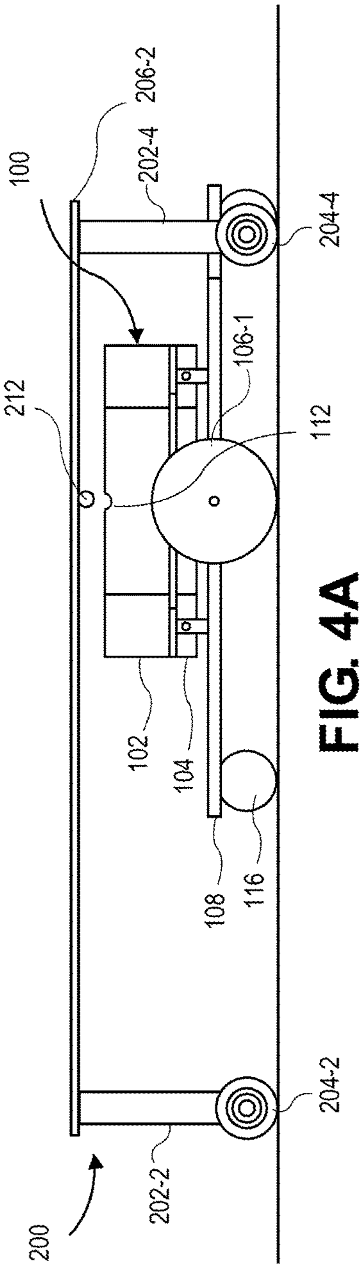
FIGS. 4A-4C are illustrations of an exemplary autonomous vehicle, in accordance with embodiments of the present disclosure.
Figure 4B:
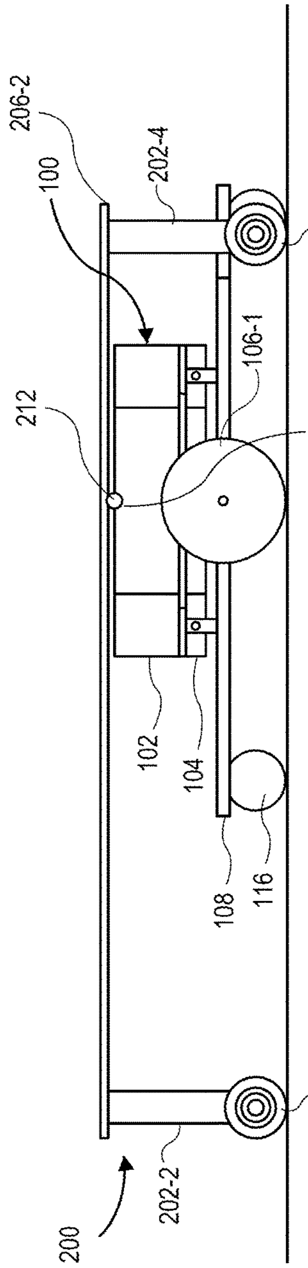
Figure 5A:
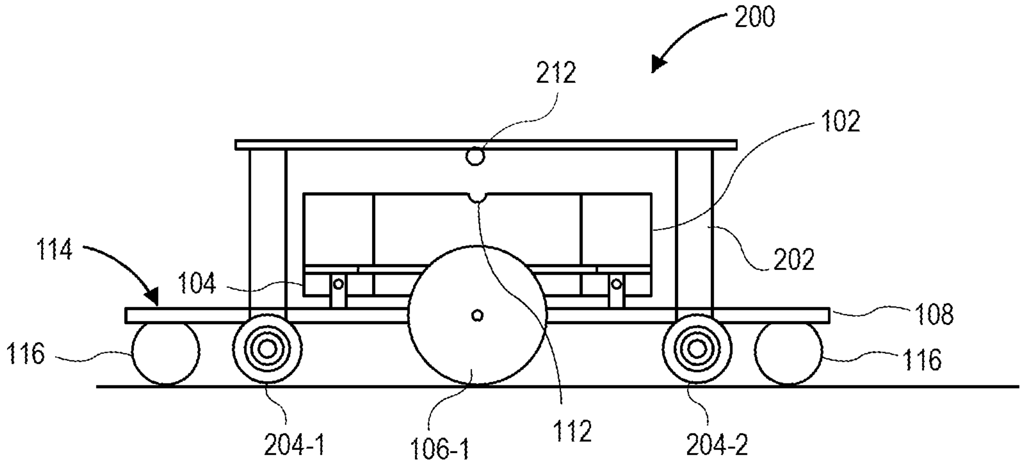
FIGS. 5A-5C are illustrations of an exemplary autonomous vehicle, in accordance with embodiments of the present disclosure.
Figure 5B:
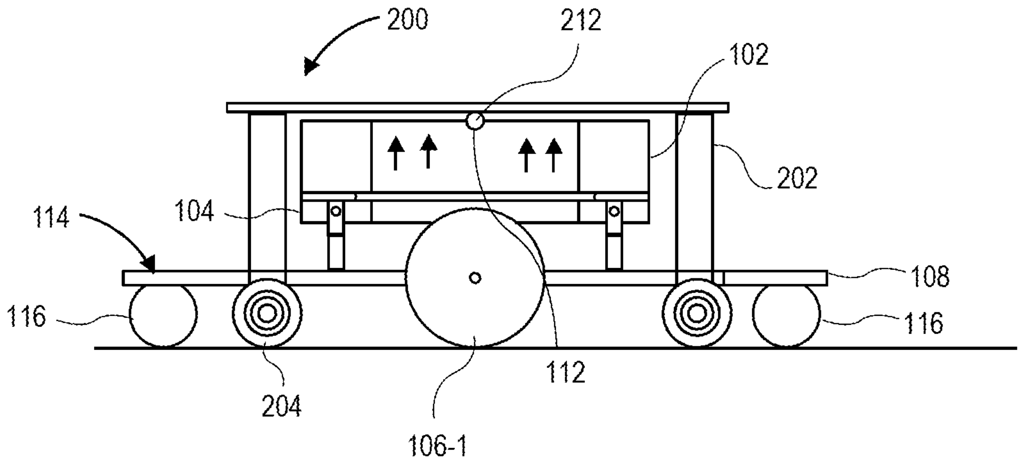
Figure 5C:
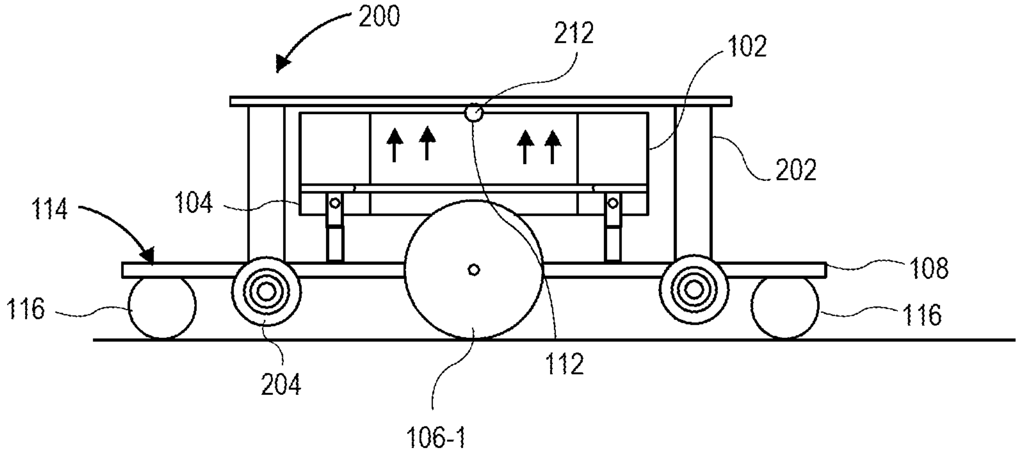

Accordingly, in step 2004, the autonomous vehicle may navigate to the location of the payload to be transported. For example, with regard to autonomous vehicle 100, this can be performed via power provided to drive wheels 106-1 and 106-2. After the autonomous vehicle has arrived at the payload to be transported, the autonomous vehicle can position itself relative to the payload carrier in preparation to engage the payload carrier, as in step 2006. Depending on the parameter and characteristics associated with the payload, as well as the type of transport to be performed, the autonomous vehicle may position itself in different orientations relative to the payload carrier. According to certain aspects, in instances where the payload carrier is a rectangular cart, the autonomous vehicle may position itself closer to one end of the cart (as shown in FIGS. 4A and 4B). For example, the autonomous vehicle may position itself closer to one end of the cart in situations where it may be preferable to move the cart longitudinally. This can include situations where the width of the route to be taken may not allow the cart to be moved transversely, where higher speed maneuvers are desired, where the cart is to be transported for longer distances, etc. In other instances, the autonomous vehicle may position itself centered (e.g., relative to a transverse dimension, a longitudinal dimension, or both) under the cart (as shown in FIGS. 5A-5C). For example, the autonomous vehicle may position center itself beneath the cart in situations where it may be preferable to move the cart transversely. This can include situations where slower speed, precision movements may be desired (e.g., staging carts, areas of high cart density, etc.).

In step 2008, the payload carrier can be engaged. As described herein, engaging the payload carrier can be accomplished by raising of a lift table of an autonomous vehicle to contact and/or engage a base portion or undercarriage of a payload carrier. For example, in implementations where the payload carrier may be a cart, the autonomous vehicle may position itself beneath the cart and engage the undercarriage of the cart. According to certain exemplary embodiments, the lifting table may include an engagement mechanism that may engage and/or mate with an engagement member provided on the payload carrier. Further, the type of engagement with the payload carrier may be determined by the how the payload carrier is to be transported. For example, in implementations where a rectangular payload carrier is to be transported in a longitudinal direction, the payload carrier may be partially lifted at one end of the payload carrier. Alternatively and/or in addition, in implementations where a rectangular payload carrier is to be transported in a transverse direction, the payload carrier may be fully lifted or partially supported by the autonomous vehicle while remaining fully in contact with the ground.

After the payload carrier has been engaged, the payload can be transported to the indicated destination, as in step 2010. According to aspects of the present disclosure, the destination can include a general location within a materials handling facility, a precise position and orientation of the payload, etc. In transporting the payload, in implementations of a rectangular payload carrier, the payload carrier may be transported in a longitudinal direction (e.g., in a direction parallel to the longitudinal direction—the longer side—of the payload carrier) for higher speed maneuvers along longer distances. Alternatively and/or in addition, for lower speed and/or precision maneuvers (e.g., staging, arranging for storage, etc.), it may be preferable to transport the payload carrier in a direction that is parallel to the transverse direction of the payload carrier. Further, the payload may be transported in accordance with a route determined and included in the transport instructions received in step 2002. Additionally, during transport of the payload to the destination, sensor information provided by the sensors of the autonomous vehicle can facilitate navigation of the autonomous vehicle (e.g., route planning, object avoidance, etc.) from the origin to the destination.

Once the payload has been transported to the indicated destination, the payload carrier can be disengaged by the autonomous vehicle, as in step 2012. According to embodiments of the present disclosure, this can include lowering of the lift table to disengage a base portion or undercarriage of the payload carrier. In implementations where the lift table may include an engagement mechanism and the payload carrier may include an engagement member, lowering of the lift table may cause the engagement mechanism to disengage the engagement member. Alternatively and/or in addition, transports including both higher speed and longer distance maneuvers (e.g., longitudinal transport) and slower speed and higher precision maneuvers (e.g., transvers transport) are also contemplated. In such an implementation, the autonomous vehicle may disengage the payload carrier, reposition itself, re-engage the payload carrier, and proceed. Further, the disengagement, re-positioning, and re-engagement can be repeated, as necessary.

Figure 3A:
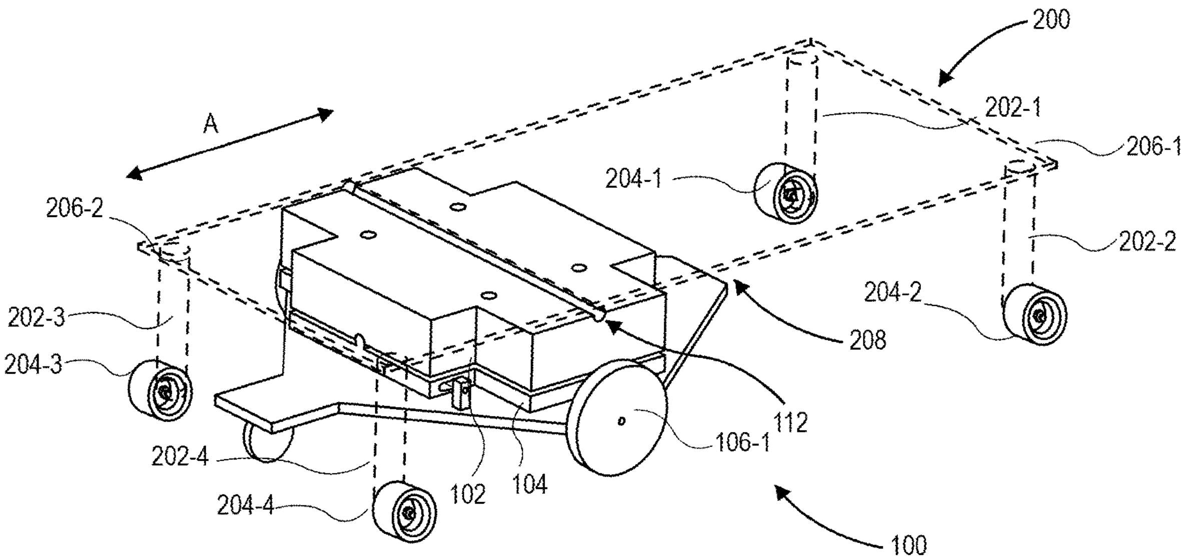
FIGS. 3A and 3B are illustrations of an exemplary autonomous vehicle, in accordance with embodiments of the present disclosure.
Figure 3B:
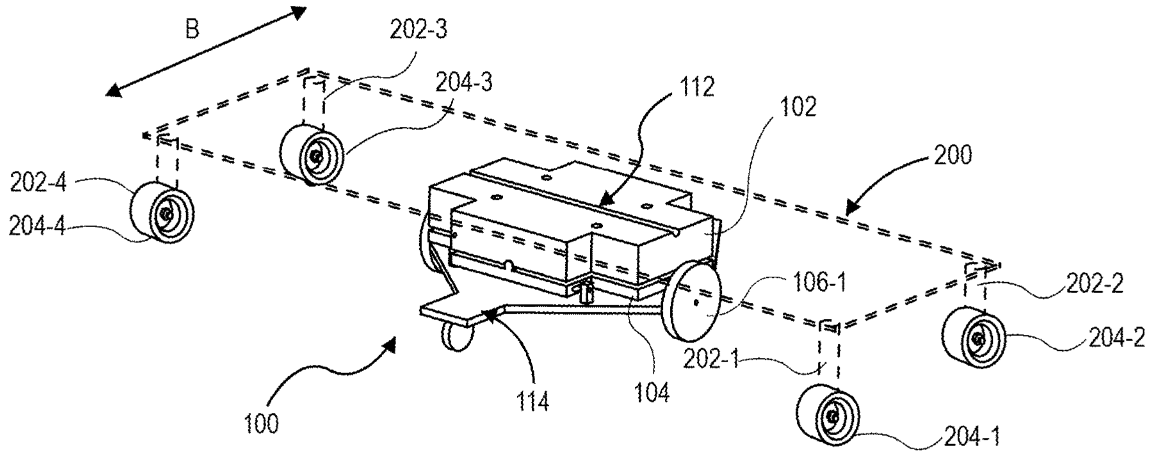

FIGS. 3A and 3B are perspective illustrations of exemplary configurations of an autonomous vehicle engaged with a payload carrier, according to embodiments of the present disclosure. FIG. 3A shows autonomous vehicle 100 positioned closer to one side of engaged payload carrier 200 (e.g., for transport in a longitudinal direction), while FIG. 3B shows autonomous vehicle 100 centered beneath engaged payload carrier 200 (e.g., for transport of payload carrier 200 in a transverse direction).

According to aspects of the present disclosure, payload carrier 200 may be substantially rectangular, and the longitudinal direction (represented by arrow A) may be the direction that is parallel to the longer dimension of payload carrier 200 and the transverse dimension (labelled by the arrow B) may refer to the direction that is parallel to the shorter dimension of payload carrier 200. Further, payload carrier 200 may be configured to carry any type of payload (e.g., items, boxes, totes, bins, etc.).

According to embodiments of the present disclosure, payload carrier 200 is preferably a cart (e.g., as shown and described in FIGS. 13A and 13B) that may be rolled across a surface. Accordingly, payload carrier 200 may include ground supports 202-1, 202-2, 202-3, and 202-4, which may contact the ground and support payload carrier 200. Further, each ground support 202 may include respective wheels or casters 204-1, 204-2, 204-3, and 204-4 that facilitate rolling of payload carrier 200 across a surface. Although payload carrier 200 is shown to be a substantially rectangular cart, embodiments of the present disclosure contemplate any type and shape of payload carrier. For example, payload carrier 200 can include any bins, totes, boxes, carts, trunks, trailers, etc.

In FIG. 3A, autonomous vehicle 100 is shown being positioned closer to one side (e.g., closer to edge 206-2) of payload carrier 200. This orientation of autonomous vehicle 100 relative to payload carrier 200 may be preferred in implementations where payload carrier 200 is being transported in a longitudinal direction (e.g., represented by arrow A). For example, in the configuration shown in FIG. 3A, lift table 102 may be in a raised position, such that engagement mechanism 112 is engaged with an engagement member disposed on undercarriage 208 of payload carrier 200. Alternatively, lift table 102 may contact and engage the bare undercarriage 208 (e.g., without an engagement mechanism) of payload carrier 200. The engagement of autonomous vehicle 100 with payload carrier 200 may be such that lift table 102 is raised to an engagement position where payload carrier 200 is partially lifted off the ground surface. In this configuration, the ground supports located closer to the engaged autonomous vehicle 100 (e.g., ground supports 202-3 and 202-4, along with casters 204-3 and 204-4) may be lifted off the ground while the ground supports located further away from the engaged autonomous vehicle 100 (e.g., ground supports 202-1 and 202-2, along with casters 204-1 and 204-2) may remain in contact with the ground. In this configuration, autonomous vehicle 100 supports a proportion of the load of the payload loaded onto payload carrier 200 such that sufficient traction is provided to drive wheels 106 of autonomous vehicle 100 to allow autonomous vehicle 100 to transport payload carrier 200. Accordingly, in this configuration, autonomous vehicle 100 may “drag” or “tow” payload carrier 200 with casters 204-3 and 204-4 being raised off the ground and casters 204-1 and 204-2 rolling in contact with the ground as payload carrier 200 is transported.

Alternatively, autonomous vehicle 100 may be engaged with payload carrier 200 to partially support payload carrier 200 such that a proportion of the load carried by payload carrier 200 is transferred to and supported by autonomous vehicle 100 while ground supports 202, along with casters 204, remain in contact with the ground. In this arrangement, lift table 102 may be raised to an intermediate engagement position such that engagement mechanism 112 engages engagement member 212 but does not raise payload carrier 200 off the ground. Accordingly, the height of lift table 102 in the intermediate engagement position in this configuration may be lower than the height of lift table 102 in the engagement position where payload carrier 200 is partially lifted off the ground surface. Further, in this configuration, autonomous vehicle 100 may “drag” or “tow” payload carrier 200 while casters 204 remain in contact with the ground surface as payload carrier 200 is transported.

Alternatively, autonomous vehicle 100 may be engaged with payload carrier 200 such that payload carrier 200 is fully lifted off the ground surface in the orientation shown in FIG. 3A. In this configuration, ground supports 202, along with caster 204, may be lifted off the ground such that payload carrier 200 is fully supported by autonomous vehicle 100. Accordingly, in this configuration, autonomous vehicle 100 may transport payload carrier 200 while fully supporting the load of payload carrier 200. Accordingly, the height of lift table 102 in the engagement position in this configuration may be higher than the height of lift table 102 in the engagement position where payload carrier 200 is partially lifted off the ground surface or being partially supported by autonomous vehicle 100.

According to certain aspects of the present disclosure, the mode of transport of payload carrier 200 (e.g., fully lifted, partially lifted, or partially supported) may be based, in addition to the direction of transport (e.g., longitudinal or transverse), on the dimensions and/or one or more parameters associated with payload carrier 200.

Although FIG. 3A shows autonomous vehicle 100 engaged with payload carrier 200 closer to closer to edge 206-2 of payload carrier 200, according to aspects of the present disclosure, payload carrier 200 may include one or more engagement members positioned on undercarriage 208 of payload carrier 200. The engagement members may be disposed at positions where it may be preferable for autonomous vehicle 100 to engage payload carrier 200. Accordingly, payload carrier 200 may include an engagement member positioned closer to edge 206-2, another engagement member centered (e.g., longitudinally centered, transversely centered, or centered longitudinally and transversely) on undercarriage 208, another engagement member positioned closer to edge 206-1, and/or any other number of engagement members disposed at any position on undercarriage 208 of payload carrier 200.

In FIG. 3B, autonomous vehicle 100 is shown being substantially centered beneath payload carrier 200. This orientation of autonomous vehicle 100 relative to payload carrier 200 may be preferred in implementations where payload carrier 200 is being transported in a transverse direction (e.g., represented by arrow B). For example, in the configuration shown in FIG. 3B, lift table 102 may be in a raised position, such that engagement mechanism 112 is engaged with an engagement member disposed on undercarriage 208 of payload carrier 200. Alternatively, lift table 102 may contact and engage the bare undercarriage 208 (e.g., without an engagement mechanism) of payload carrier 200. The engagement of autonomous vehicle 100 with payload carrier 200 may be such that lift table 102 is raised to an engagement position where payload carrier 200 is partially supported by autonomous vehicle 100 such that a proportion of the load carried by payload carrier 200 is transferred to and supported by autonomous vehicle 100 while ground supports 202, along with casters 204, remain in contact with the ground. In this arrangement, lift table 102 may be raised to an intermediate engagement position such that engagement mechanism 112 engages engagement member 212 but does not raise payload carrier 200 off the ground. Further, in this configuration, autonomous vehicle 100 may “drag” or “tow.” payload carrier 200 while casters 204 remain in contact with the ground surface as payload carrier 200 is transported.

Alternatively, autonomous vehicle 100 may be engaged with payload carrier 200 such that payload carrier 200 is fully lifted off the ground surface. In this configuration, ground supports 202, along with caster 204, may be lifted off the ground such that payload carrier 200 is fully supported by autonomous vehicle 100. Accordingly, in this configuration, autonomous vehicle 100 may transport payload carrier 200 while fully supporting the load of payload carrier 200. Accordingly, the height of lift table 102 in the engagement position in this configuration may be higher than the height of lift table 102 in the engagement position where payload carrier 200 is partially lifted off the ground surface.

According to yet another aspect of the present disclosure, the engagement of autonomous vehicle 100 with payload carrier 200 in the orientation shown in FIG. 3B may be such that lift table 102 is raised to an engagement position where payload carrier 200 is partially lifted off the ground surface. In this configuration, the ground supports located on one side of payload carrier 200 (e.g., ground supports 202-1 and 202-4, along with casters 204-1 and 204-4) may be lifted off the ground while other ground supports (e.g., ground supports 202-2 and 202-3, along with casters 204-2 and 204-3) may remain in contact with the ground. In this configuration, autonomous vehicle 100 supports a proportion of the load of the payload loaded onto payload carrier 200 such that sufficient traction is provided to drive wheels 106 of autonomous vehicle 100 to allow autonomous vehicle 100 to transport payload carrier 200. Accordingly, in this configuration, autonomous vehicle 100 may "drag" or "tow" payload carrier 200 with casters 204-1 and 204-4 being raised off the ground while casters 204-2 and 204-3 may be rolling in contact with the ground as payload carrier 200 is transported.

According to certain aspects of the present disclosure, the mode of transport of payload carrier (e.g., fully lifted, partially lifted, or partially supported) may be based, in addition to the direction of transport (e.g., longitudinal or transverse), on the dimensions and/or one or more parameters associated with payload carrier 200.

According to embodiments of the present disclosure, certain orientations and/or configurations of the engagement of autonomous vehicle 100 with payload carrier 200 may be preferred for specific modes of transport. For example, for higher speed maneuvers along longer distances, it may be preferable to transport the payload in a direction parallel to the longitudinal direction of the payload carrier. Conversely, for lower speed transport and maneuvers requiring precision, it may be preferable to transport the payload in a direction that is parallel to the transverse direction of the payload carrier.

Figure 4C:
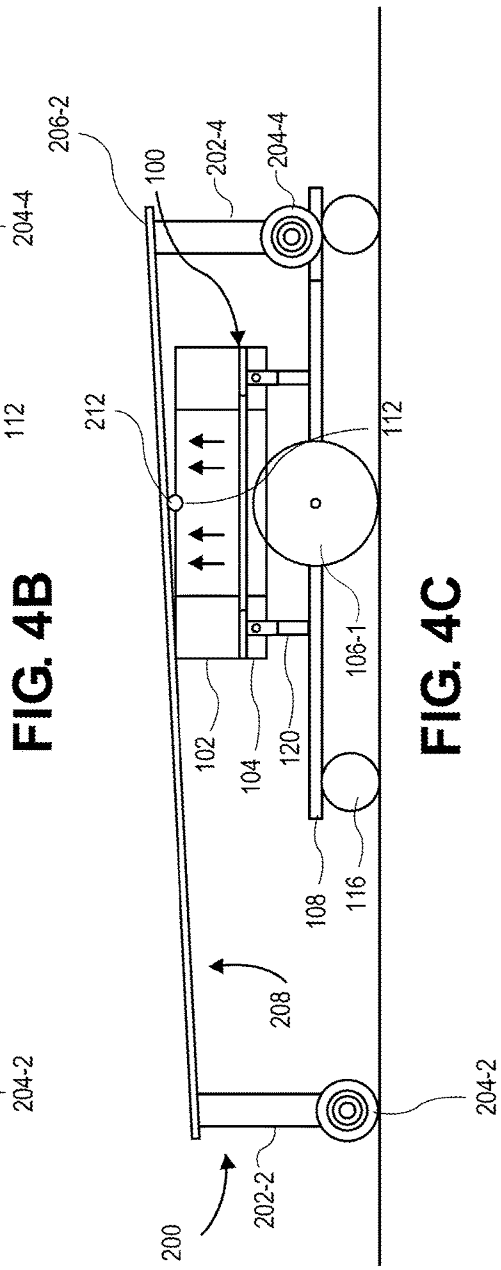

FIGS. 4A-4C are side view illustrations of various exemplary engagements of an autonomous vehicle engaged with a payload carrier, according to embodiments of the present disclosure. FIG. 4A shows autonomous vehicle 100 disengaged with payload carrier 200, while FIGS. 4B and 4C show various engagement configurations where autonomous vehicle 100 is engaged with payload carrier 200 while positioned closer to one side of payload carrier 200 (e.g., for transport in a longitudinal direction).

FIG. 4A shows autonomous vehicle 100 positioned beneath payload carrier 200, which, for example, may be performed in preparation to engage payload carrier 200 and perform a transport. As shown in FIG. 4A, autonomous vehicle 100 may be positioned closer to one edge of payload carrier (e.g., in the longitudinal direction) beneath payload carrier 200 and aligned with engagement member 212. According to certain aspects, payload carrier 200 may not include engagement member 212 and autonomous vehicle 100 may simply engage with a base portion and/or undercarriage of payload carrier 200.

In FIG. 4B, autonomous vehicle 100 may be engaged with payload carrier 200 where autonomous vehicle 100 is partially supporting payload carrier 200 such that a proportion of the load carried by payload carrier 200 is transferred to and supported by autonomous vehicle 100 while ground supports 202, along with casters 204, remain in contact with the ground. Lift table 102 may be raised (e.g., by lift supports 120) to an intermediate engagement position such that engagement mechanism 112 engages engagement member 212 but does not raise payload carrier 200 off the ground. Accordingly, the height of lift table 102 in the intermediate engagement position in this configuration may be lower than the height of lift table 102 in the engagement position where payload carrier 200 is partially lifted off the ground surface. In this configuration, the proportion of the payload carried by payload carrier 200 supported by autonomous vehicle 100 provides traction to drive wheels 106 to enable autonomous vehicle 100 to transport payload carrier 200. Further, in this configuration, autonomous vehicle 100 may "drag" or "tow" payload carrier 200 while casters 204 remain in contact with the ground surface as payload carrier 200 is transported. To facilitate the configuration shown in FIG. 4B, where autonomous vehicle 100 may be partially supporting the load presented by payload carrier 200, one or more compliance mechanisms are preferably disposed on autonomous vehicle 100, payload carrier 200, or both autonomous vehicle 100 and payload carrier 200. For example, lift table 102, mounting block 104, and/or casters 116 may be spring-loaded (e.g., coupled to chassis 108 via springs). Alternatively and/or in addition, payload carrier 200 may include a compliance mechanism (e.g., spring-loaded casters 204, engagement member 212, ground supports 202, etc.).

In FIG. 4C, autonomous vehicle 100 may be engaged with payload carrier 200 where payload carrier 200 is partially lifted off the ground surface. As shown in FIG. 4C, lift table 102 may be raised (e.g., by lift supports 120) to an engagement position such that engagement mechanism 112 engages engagement member 212 and raises caster 204-4 off the ground surface, while caster 204-2 remains in contact with the ground surface. Accordingly, the height of lift table 102 in the engagement position in this configuration may be higher than the height of lift table 102 in the engagement position where payload carrier 200 is partially supported by autonomous vehicle 100 while remaining in contact with the ground surface, as shown in FIG. 4B. Accordingly, in this configuration, autonomous vehicle 100 may "drag" or "tow" payload carrier 200 with caster 204-4 (and 204-3) being raised off the ground and caster 204-2 (and 204-1) rolling in contact with the ground as payload carrier 200 is transported.

As shown in FIGS. 4B and 4C, engagement mechanism 112 of autonomous vehicle 100 may be engaged with engagement member 212 of payload carrier 200. In addition to providing a releasable coupling of autonomous vehicle 100 with payload carrier 200, the engagement of engagement mechanism 112 with engagement member 212 may also provide a pivot joint. For example, the engagement of engagement mechanism 112 with engagement member 212 of payload carrier 200 can provide a pivot joint to facilitate relative movement between payload carrier 200 and autonomous vehicle 100. As shown in FIGS. 4B and 4C, the pivot joint provided by the engagement of engagement mechanism 112 with engagement member 212 of payload carrier 200 can provide relative rotational movement about the pitch (e.g., transverse) axis.

FIG. 5A is a side view illustration of an exemplary autonomous vehicle disengaged with a payload carrier and FIGS. 5B and 5C are a side view illustrations of an exemplary engagement of an autonomous vehicle with a payload carrier, according to embodiments of the present disclosure. FIGS. 5A-5C show positioning and engagement of autonomous vehicle 100 with payload carrier 200 centered under payload carrier 200 (e.g., for transport in a transverse direction).

FIG. 5A shows autonomous vehicle 100 positioned beneath payload carrier 200, which, for example, may be performed in preparation to engage payload carrier 200 and perform a transport. As shown in FIG. 5A, autonomous vehicle 100 may be substantially centered (e.g., transversely, longitudinally, or both transversely and longitudinally) beneath payload carrier 200 and aligned with engagement member 212. According to certain aspects, payload carrier 200 may not include engagement member 212 and autonomous vehicle 100 may simply engage with a base portion and/or undercarriage of payload carrier 200.

FIG. 5B shows autonomous vehicle 100 engaged with payload carrier 200 where autonomous vehicle 100 may be partially supporting payload 200 such that a proportion of the load of the payload carried by payload 200 is transferred to and supported by autonomous vehicle 100 while ground supports 202, along with casters 204, remain in contact with the ground. Accordingly, lift table 102 may have been raised (e.g., by lift supports 120) to an intermediate engagement position such that engagement mechanism 112 engages engagement member 212 but does not raise payload carrier 200 off the ground. According to certain aspects where payload carrier does not include engagement member 212, lift table 102 may simply contact and engage a base portion or undercarriage of payload carrier 200. Accordingly, the height of lift table 102 in the intermediate engagement position in this configuration may be lower than the height of lift table 102 in the engagement position where payload carrier 200 is partially or fully lifted off the ground surface. In this configuration, the proportion of the payload carried by payload carrier 200 supported by autonomous vehicle 100 provides traction to drive wheels 106 to enable autonomous vehicle 100 to transport payload carrier 200. Further, in this configuration, autonomous vehicle 100 may "drag" or "tow" payload 200 while casters 204 remain in contact with the ground surface as payload 200 is transported.

FIG. 5C shows autonomous vehicle 100 engaged with payload carrier 200 where autonomous vehicle 100 may be engaged with payload carrier 200 such that payload carrier 200 is fully lifted off the ground surface. In this configuration, ground supports 202, along with caster 204, may be lifted off the ground such that payload carrier 200 is fully supported by autonomous vehicle 100. Accordingly, in this configuration, autonomous vehicle 100 may transport payload carrier 200 while fully supporting the load of payload carrier 200. Accordingly, the height of lift table 102 in the engagement position in this configuration may be higher than the height of lift table 102 in the engagement position where payload carrier 200 is partially lifted off the ground surface or being partially supported by autonomous vehicle 100.

Figure 6A:
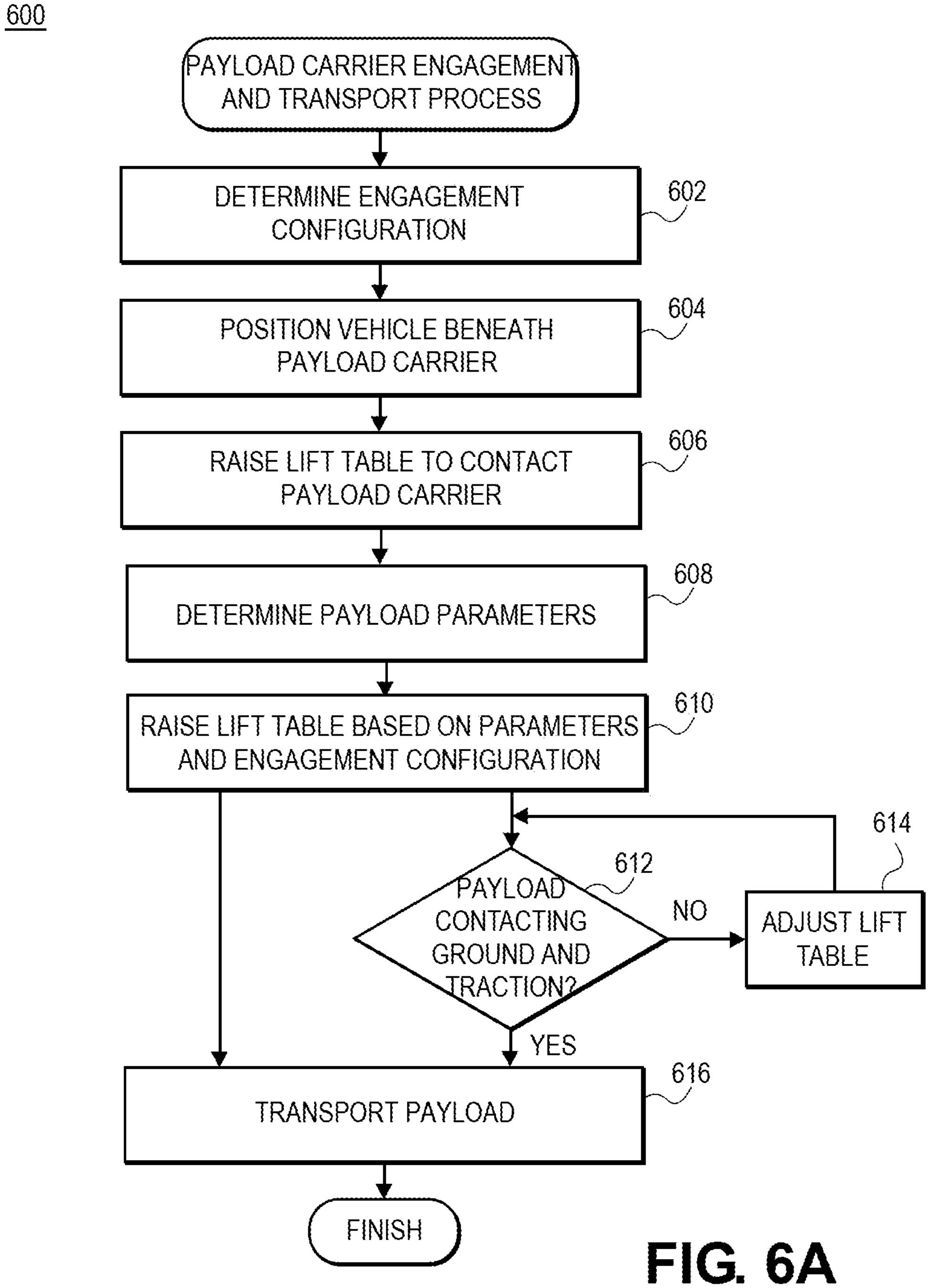
FIG. 6A is a flow diagram of an exemplary process for transporting a payload carrier, in accordance with embodiments of the present disclosure.

FIG. 6A is a flow diagram of an exemplary process 600 for engaging and transporting a payload, according to embodiments of the present disclosure. For example, process 600 may be performed by an autonomous vehicle (e.g., autonomous vehicle 100) in engaging a payload carrier in any of the configurations illustrated in FIG. 4A, 4B, or 5B.

As shown in FIG. 6A, process 600 can begin at step 602, where the engagement configuration of the autonomous vehicle and the payload carrier to be employed in transporting the payload can be determined. This can be determined, for example, based on the type of transport to be performed, which may be specified in transport instructions. Once the engagement configuration has been determined, the autonomous vehicle can be positioned beneath the payload carrier, as in step 604. For example, the autonomous vehicle can be positioned closer to one edge of the payload carrier or be centered (e.g., transversely, longitudinally, or both transversely and longitudinally). Further, positioning of the autonomous vehicle beneath the payload carrier can also include positioning the autonomous vehicle so that an engagement mechanism of the autonomous vehicle may be aligned with an engagement member of the payload carrier. The positioning can be performed, for example, after transport instructions have been received, and the autonomous vehicle has navigated to the location of the payload to be transported.

In step 606, the lift table may be raised to contact a base portion or undercarriage of the payload carrier. The lift carrier may be raised to a height, for example, to engage an engagement member of the payload carrier and support a portion of the load to determine certain parameters associated with the payload using sensors disposed in the lift table and/or autonomous vehicle. Accordingly, in step 608, certain parameters associated with the payload can be determined. For example, the mass, weight, center of gravity, etc. of the payload can be determined.

Next, in step 610, the lift table of the autonomous vehicle can be raised to engage the payload carrier in accordance with the engagement configuration and based on the parameters associated with the payload. For example, the lift table can be raised to perform a fully lifted engagement of the payload carrier where all the ground contacting supports of the of payload carrier are raised off the ground. Alternatively, the lift table can be raised to perform a partial lift of the payload carrier such that certain ground contacting supports of the payload carrier are raised off the ground while other ground contacting supports of the payload carrier remain in contact with the ground. According to another aspect, the lift table can be raised to partially support the load of the payload carried by the payload carrier.

In the implementation where the lift table is raised to partially support the load of the payload carried by the payload carrier, in step 612, it can be determined whether the height of the lift table has allowed the autonomous vehicle to support sufficient load to provide traction to the drive wheels while ensuring that the ground contacting supports of the payload carrier remain in contact with the ground. In the event that the ground contacting supports of the payload carrier are no longer in contact with the ground and/or the drive wheels do not have sufficient traction to transport the payload, the height of the lift table can be adjusted, as in step 614. For example, if the drive wheels have insufficient traction, the height of the lift table can be raised to transfer additional load to the autonomous vehicle. Alternatively, if the ground contacting supports of the payload carrier are not contacting the ground, the height of the lift table can be lowered so that the ground contacting supports of the payload carrier contact the ground surface.

Next, in step 616, after engagement of the payload carrier has been performed, the payload can be transported. The payload may be transported in accordance with a route determined and included in the transport instruction, and in view of sensor information provided by the sensors of the autonomous vehicle to facilitate navigation of the autonomous vehicle (e.g., route planning, object avoidance, etc.) from the origin to the destination.

Figure 6B:
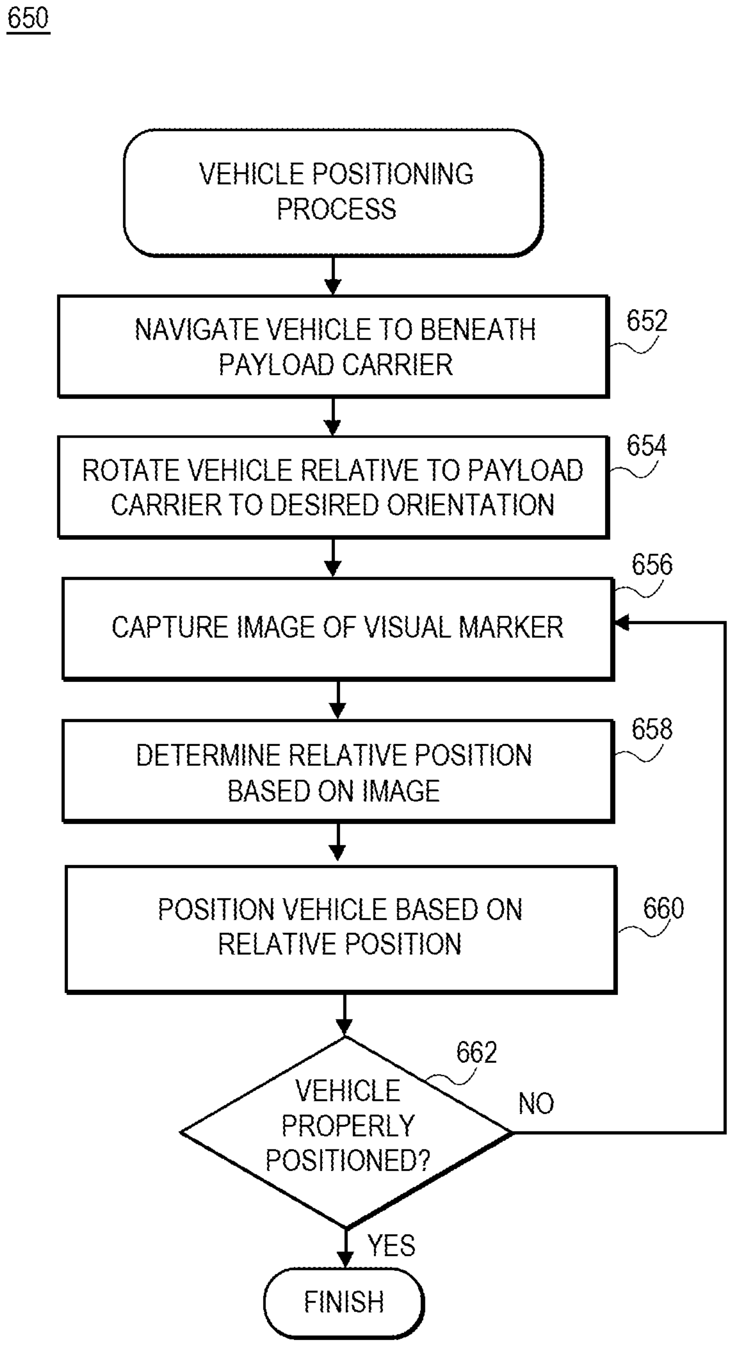
FIG. 6B is a flow diagram of an exemplary process for positioning an autonomous vehicle beneath a payload carrier, in accordance with embodiments of the present disclosure.

FIG. 6B is a flow diagram of an exemplary process 650 for positioning an autonomous vehicle relative to a payload carrier. For example, process 650 may be a subprocess showing further steps in connection with step 2006, as shown and described in connection with FIG. 2 or step 604, as shown and described in connection with FIG. 6A, which may be performed by an autonomous vehicle (e.g., autonomous vehicle 100) in engaging a payload carrier in any of the configurations illustrated in FIG. 4A, 4B, or 5B.

As shown in FIG. 6B, process 650 can begin at step 652, where the autonomous vehicle can navigate beneath the payload carrier to be transported. After the autonomous vehicle is positioned beneath the payload carrier to be transported, the autonomous vehicle may rotate to orient itself relative to the payload carrier, as in step 654. For example, the autonomous vehicle can rotate itself such that it is oriented to transport the payload carrier in a longitudinal direction. Alternatively, the autonomous vehicle may rotate itself such that it is oriented to transport the payload carrier in a transverse direction.

After the autonomous vehicle has oriented itself relative to the payload carrier in view of the transport direction to be employed, the autonomous vehicle can capture an image of one or more visual markers, as in step 656. For example, the autonomous vehicle may include an imaging sensor, and may capture images of certain visual markers to determine its relative position. The visual markers can include stickers, fiducials, etc. coupled to the payload carrier at known positions. Alternatively, the visual markers can include components of the payload carrier, such as caster wheels, ground supports, the edge of the undercarriage, etc.

Based on the images of the visual makers, a position of the autonomous vehicle relative to the payload carrier can be determined, as in step 658. Based on the relative position of the autonomous vehicle, the vehicle can position itself to the desired position, as in step 660. For example, a fiducial can indicate the desired positioning of the autonomous vehicle, and the autonomous vehicle can position itself relative to the payload carrier until it is aligned with the fiducial. Alternatively, a fiducial may indicate that the vehicle is to be positioned at a certain distance, in a certain direction from the fiducial. Accordingly, the autonomous vehicle may then position itself such that it is aligned with the defined position at a distance from the fiducial.

In step 662, the autonomous vehicle can assess whether it is properly positioned relative to the payload carrier. In the event that it is not properly positioned, one or more images of one or more visual markers may be determined and the process may be repeated. In the event that the autonomous vehicle is properly positioned, process 650 may finish.

Figure 7A:
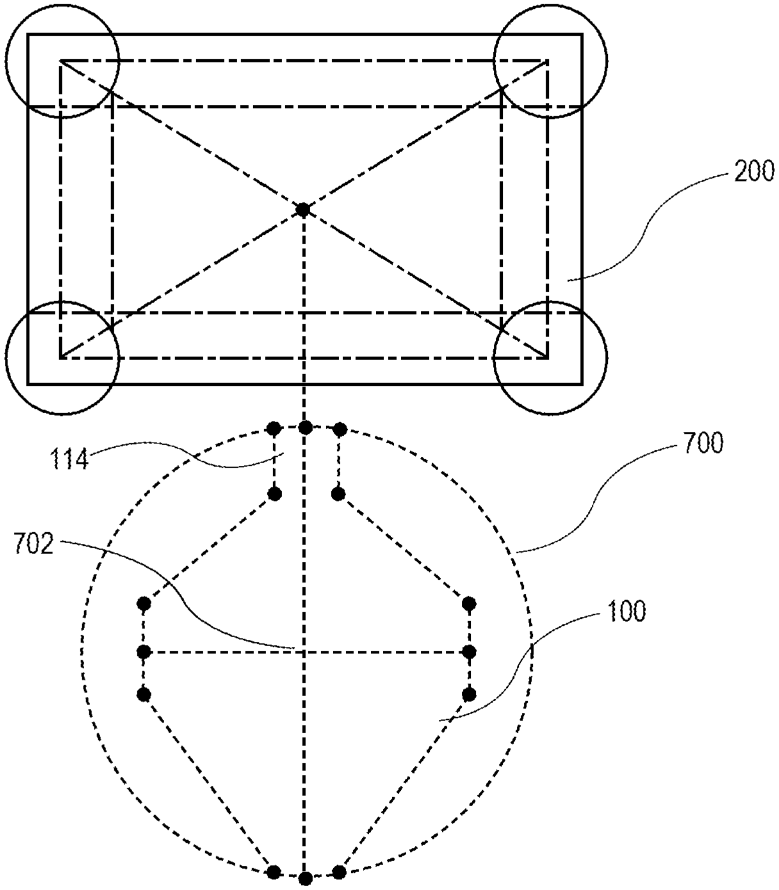
FIGS. 7A-7C are line illustrations of exemplary dimensions of an autonomous vehicle, in accordance with embodiments of the present disclosure.
Figure 7B:
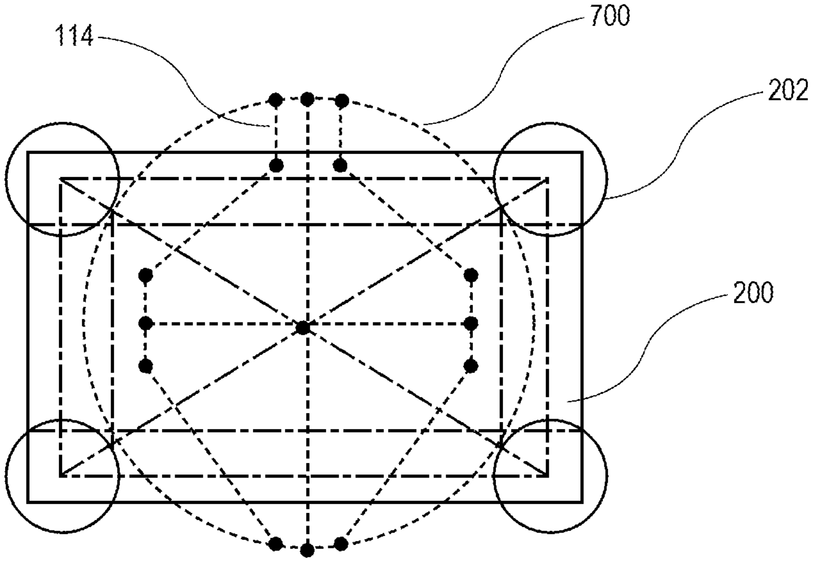
Figure 7C:
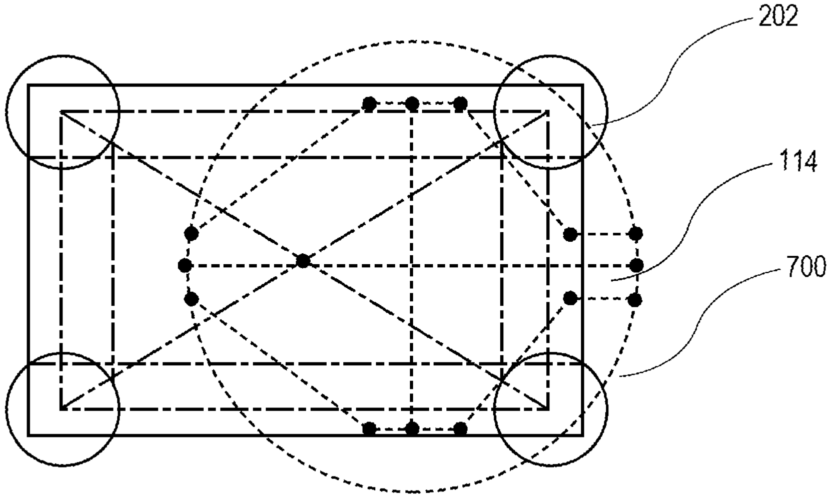

FIGS. 7A-7C are dimensional line diagrams illustrating exemplary configurations of sensors coupled to an autonomous vehicle relative to a payload carrier, according to exemplary embodiments of the present disclosure. FIGS. 7A-7C illustrate the relative configuration of payload carrier 200 and autonomous vehicle 100, including the positioning of extending portion 114, on which sensors 118 may be disposed.

FIG. 7A shows autonomous vehicle 100 separate from payload carrier 200. Here, autonomous vehicle 100 is disengaged from payload carrier 200 and is not positioned beneath payload carrier 200. As shown in FIG. 7A, autonomous vehicle 100 is shown with extending portion 114 (on which sensors 118 may be coupled) and turning radius 700 of autonomous vehicle 100. Turning radius 700 may represent the maximum dimension of autonomous vehicle 100 if autonomous vehicle 100 were to rotate about its center point 702.

FIG. 7B shows autonomous vehicle 100 positioned beneath payload carrier 200 in a centered position. The illustration shown in FIG. 7B may dimensionally represent the configuration of autonomous vehicle 100 shown in FIGS. 3B, 5A, and 5B, where autonomous vehicle is centered beneath payload carrier 200. According to aspects of the present disclosure, this engagement configuration may be preferred in implementations where autonomous vehicle 100 may be transporting payload carrier 200 in a transverse direction.

As shown in FIG. 7B, in this configuration, extending portion 114 extends beyond the periphery of payload carrier 200, so as to increase the field of view of any sensors disposed on extending portion 114. Further, autonomous vehicle 100 is preferably sized and dimensioned such that turning radius 700 is designed and dimensioned such that it is unobstructed by any portion of payload carrier 200 (e.g., ground supports 202 and casters 204). Accordingly, autonomous vehicle 100 can center itself beneath payload carrier 200 and fully rotate 360 without contacting any portion of payload carrier 200. As described herein the ability of autonomous vehicle 100 to fully rotate, without obstruction, beneath payload carrier 200 can facilitate the ability for autonomous vehicle 100 to quickly and efficiently maneuver under payload carrier 200, including the changing of an orientation relative to payload carrier 200 while remaining within the footprint of payload carrier 200. Additionally, this can facilitate efficient arrangement and organization of payload carriers.

FIG. 7C shows autonomous vehicle 100 positioned beneath payload carrier 200 in a position closer to one side of payload carrier 200. The illustration shown in FIG. 7C may dimensionally represent the configuration of autonomous vehicle 100 shown in FIGS. 3A, 4A, and 4B, where autonomous vehicle 100 is positioned beneath payload carrier 200 closer to one edge of payload carrier 200. According to aspects of the present disclosure, this engagement configuration may be preferred in implementations where autonomous vehicle 100 may be transporting payload carrier 200 in a longitudinal direction. For example, autonomous vehicle 100 may have navigated to and positioned itself beneath payload carrier 200 (e.g., from the configuration shown in FIG. 7A to the configuration shown in FIG. 7B). Then, from the orientation shown in FIG. 7B, autonomous vehicle 100 may have rotated beneath payload carrier 200 (without contacting any portion of payload carrier 200) 90 in a clockwise direction and pulled forward to position itself in the configuration shown in FIG. 7C.

Figure 8A:
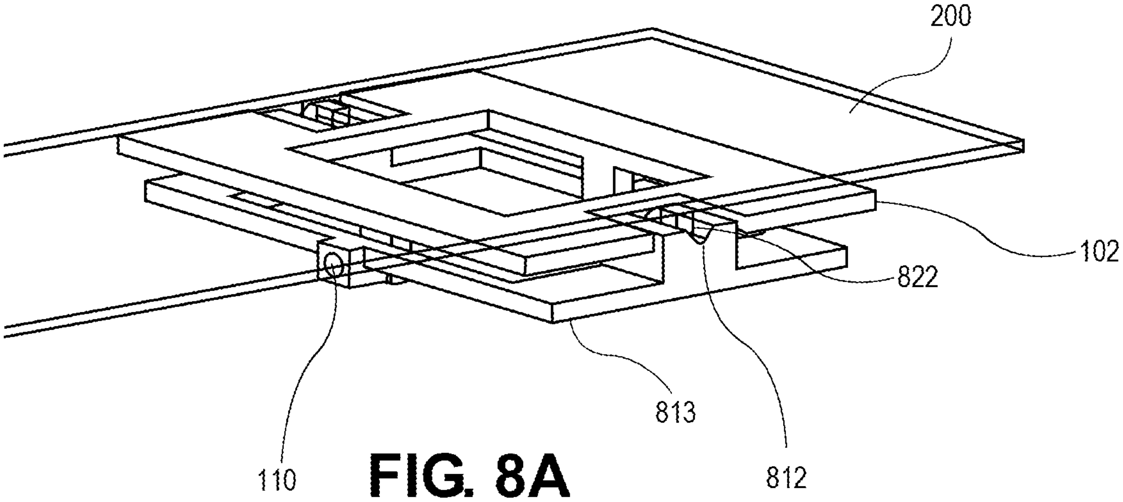
FIGS. 8A-8C are illustrations of an exemplary engagement mechanism and engagement member, in accordance with embodiments of the present disclosure.
Figure 8B:
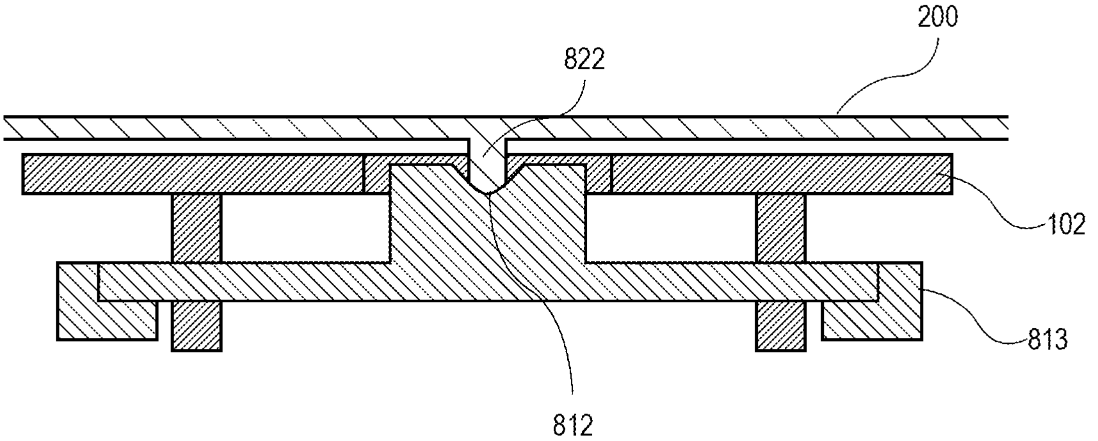
Figure 8C:
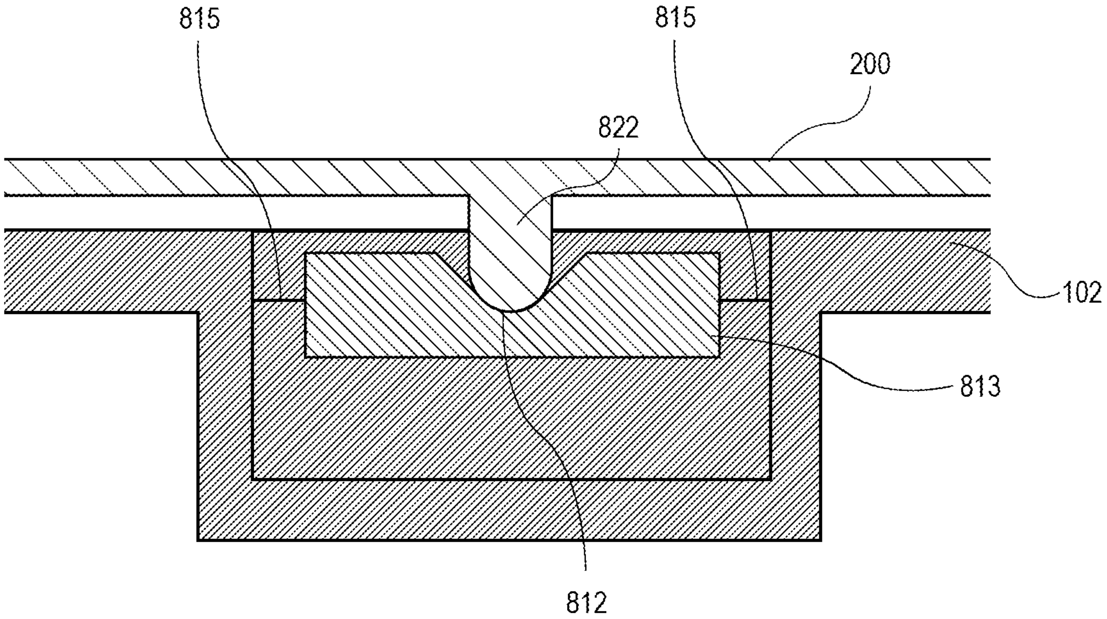

FIGS. 8A-8C show an exemplary engagement mechanism and engagement member, in accordance with embodiments of the present disclosure. The engagement mechanism and engagement member shown in FIGS. 8A-8C may, for example, be one exemplary implementation of engagement mechanism 112 and engagement member 212 shown in FIGS. 1A-1C, 3A, 3B, 4A, 4B, 5A, and 5B that may engage to form a pitch joint when engaged. The relative movements provided by the pivot pitch joint formed by the engagement of the engagement mechanism and the engagement member of the payload carrier can facilitate transporting of a payload over uneven floors, compensating for shifts in the load resulting from acceleration and deceleration of autonomous vehicle 100, providing increased traction at the drive wheels, etc. For example, the pitch pivot joint can permit relative motion to facilitate that the drive wheels of the autonomous vehicle remain in contact with the ground surface, even over uneven and broken ground surfaces (e.g., bumps, cracks, uneven floors, etc.). Additionally, the pitch pivot joint can facilitate at least one caster wheel of the autonomous vehicle to also remain in contact with the ground surface, to provide further stability to the autonomous vehicle. Further, the pitch pivot joint can compensate for moments created by acceleration and/or deceleration of the autonomous vehicle, by facilitating shifts in the center of gravity of the load (e.g., between drive wheels 106 and caster wheels 116, etc.), to provide increased stability of the autonomous vehicle during transport of a payload.

FIGS. 8A-8C show engagement mechanism 812 (e.g., of an autonomous vehicle such as autonomous vehicle 100) engaged with engagement member 822 (e.g., of a payload carrier, such as payload carrier 200). As shown in FIGS. 8A-8C, engagement mechanism 812 may be disposed on, coupled to, or formed in a portion of carrier plate 813 and engagement member 822 may be disposed on or otherwise coupled to a base portion or undercarriage of payload carrier 200. According to certain aspects and as shown in FIG. 8C, carrier plate 813 may be coupled to lift table 102 via springs 815. In operation, lift plate 102 may be raised to contact a base portion or undercarriage of payload carrier 200 such that engagement mechanism 812 may engage engagement member 822.

Engagement mechanism 812 and engagement member 822 may include complementary shapes such that engagement member 822 may be received by and engaged with engagement mechanism 812. For example, engagement member 822 may include a protrusion, extension, etc. configured to be received by engagement mechanism 812, which may include a groove, recess, indentation, etc. configured to receive the protrusion, extension, etc. of engage engagement member 822. Accordingly, engagement of engagement mechanism 812 with engagement member 822 can provide releasable engagement of engagement mechanism 812 and engagement member 822.

According to certain aspects, engagement mechanism 812 can include angled sides to urge, guide, and facilitate engagement with engagement member 822. Further, engagement mechanism 812 and engagement member 822 can include complementary curved portions to provide a pivot joint when engaged. For example, when engagement mechanism 812 and engagement member 822 are engaged, the curved portions of engagement mechanism 812 and engagement member 822 can cooperate to provide relative rotational movement about the pitch (e.g., transverse) axis.

Although FIGS. 8A-8C show engagement mechanism 812 having a recess and engagement member 822 having a protrusion, any mechanism by which releasable engagement and a pivoting joint can be provided may be employed. Further, according to other embodiments, the arrangement may be reversed, where engagement mechanism 812 may include a protrusion and engagement member 822 may include a recess configured to receive and engage engagement mechanism 812.

Figure 9A:
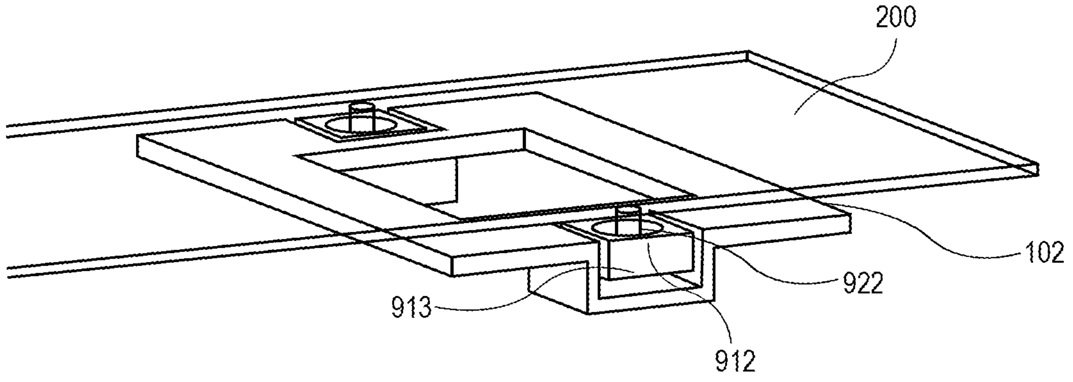
FIGS. 9A-9C are illustrations of an exemplary engagement mechanism and engagement member, in accordance with embodiments of the present disclosure.
Figure 9B:
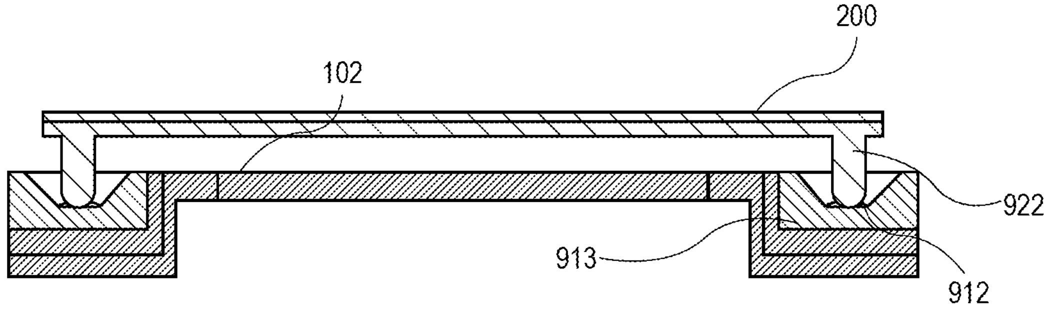
Figure 9C:
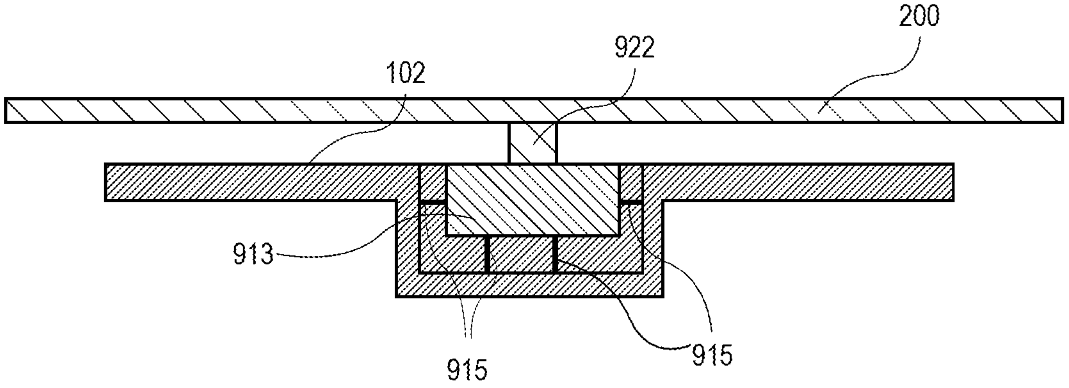

FIGS. 9A-9C show yet another exemplary engagement mechanism and engagement member, in accordance with embodiments of the present disclosure. The engagement mechanism and engagement member shown in FIGS. 9A-9C may, for example, be one exemplary implementation of engagement mechanism 112 and engagement member 212 shown in FIGS. 1A-IC, 3A, 3B, 4A, 4B, 5A, and 5B.

FIGS. 9A-9C show engagement mechanism 912 (e.g., of an autonomous vehicle such as autonomous vehicle 100) engaged with engagement member 922 (e.g., of a payload carrier, such as payload carrier 200). As shown in FIGS. 9A-9C, engagement mechanism 912 may be disposed on, coupled to, or formed in a portion of carrier plate 913 and engagement member 922 may be disposed on or otherwise coupled to a base portion or undercarriage of payload carrier 200. According to certain aspects and as shown in FIG. 9C, engagement plate 913 may be coupled to lift table 102 via springs 915. In operation, lift plate 102 may be raised to contact a base portion or undercarriage of payload carrier 200 such that engagement mechanism 912 may engage engagement member 922.

Similar to the engagement mechanism and engagement member shown in FIGS. 8A-8C, engagement mechanism 912 and engagement member 922 may include complementary shapes such that engagement member 922 may be received by and engaged with engagement mechanism 912. For example and as shown in FIGS. 9A-9C, engagement mechanism 912 and engagement member 922 may include a pin and socket type arrangement. Specifically, engagement member 922 may include a protrusion, extension, etc. configured to be received by engagement mechanism 912, which may include a groove, recess, indentation, cup, socket, cone, etc. configured to receive the protrusion, extension, etc. of engage engagement member 922. Accordingly, engagement of engagement mechanism 912 with engagement member 922 can provide releasable engagement of engagement mechanism 912 and engagement member 922.

According to certain aspects, engagement mechanism 912 can include angled sides to urge, guide, and facilitate engagement with engagement member 922. Further, engagement mechanism 912 and engagement member 922 can include complementary curved portions to provide a pivot joint when engaged. For example, when engagement mechanism 912 and engagement member 922 are engaged, the curved portions of engagement mechanism 912 and engagement member 922 can cooperate to provide relative rotational movement about the pitch (e.g., transverse) axis and the roll (e.g., longitudinal) axis.

Although FIGS. 9A-9C show engagement mechanism 912 having a socket and engagement member 922 having a protrusion, any mechanism by which releasable engagement and a pivoting joint can be provided may be employed. Further, according to other embodiments, the arrangement may be reversed, where engagement mechanism 912 may include a protrusion and engagement member 922 may include a socket configured to receive and engage engagement mechanism 912.

Figure 10A:
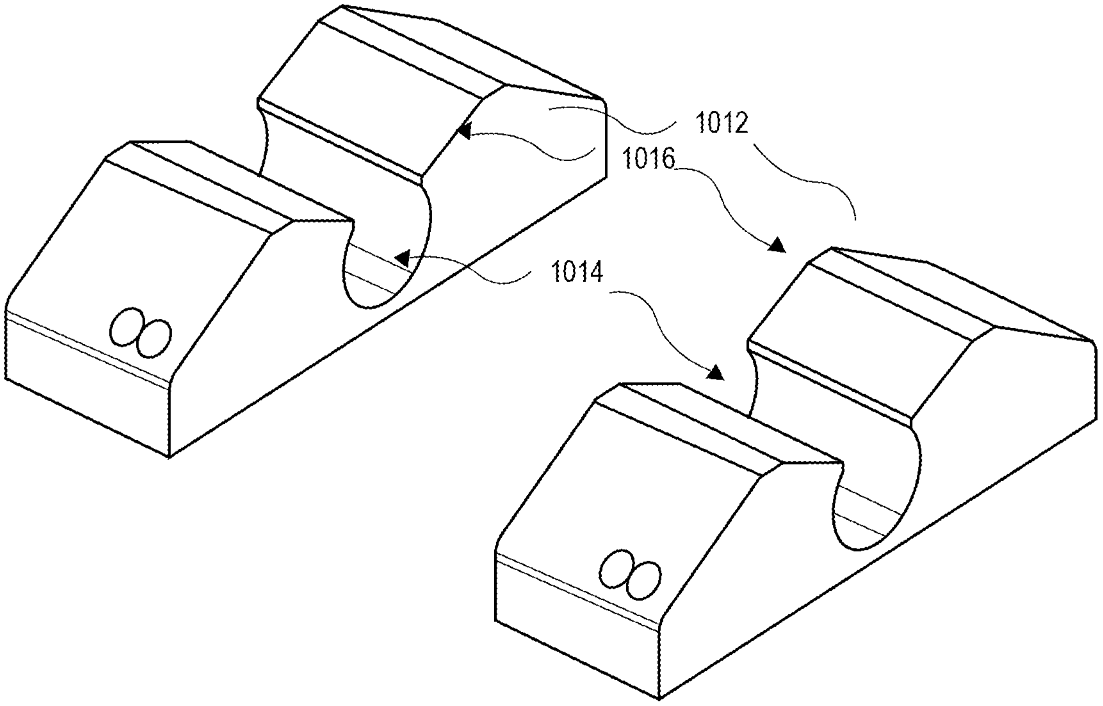
FIGS. 10A and 10B are illustrations of an exemplary engagement mechanism and engagement member, in accordance with embodiments of the present disclosure.
Figure 10B:
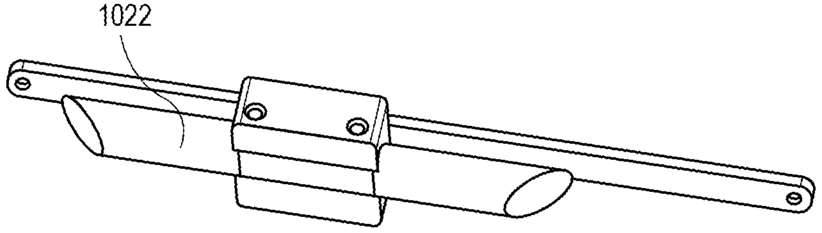

FIGS. 10A and 10B show yet another exemplary engagement mechanism and engagement member, in accordance with embodiments of the present disclosure. The engagement mechanism and engagement member shown in FIGS. 10A and 10B may, for example, be one exemplary implementation of engagement mechanism 112 and engagement member 212 shown in FIGS. 1A-1C, 3A, 3B, 4A, 4B, 5A, and 5B.

FIG. 10A shows engagement mechanism 1012 (e.g., of an autonomous vehicle such as autonomous vehicle 100), which may be configured to engage engagement member 1022 (e.g., of a payload carrier, such as payload carrier 200). According to aspects of the present disclosure, engagement mechanism 1012 may be coupled to a lift table or engagement plate of an autonomous vehicle and engagement member 1022 may be coupled to a base portion or undercarriage of a payload carrier. According to certain aspects, engagement mechanism 1012 may be coupled to an engagement plate that includes a pivot roll joint, so as to provide relative rotational movement about the roll (e.g., longitudinal) axis. In operation, engagement mechanism 1012 may be raised to provide releasable engagement with engagement member 1022.

As shown in FIGS. 10A and 10B, engagement mechanism 1012 can include a detent coupler, and engagement member

1022 can include a detent coupler bar. For example, engagement member 1022 can be received by and engage with recesses 1014 defined by engagement mechanism 1012. Further, engagement mechanism 1012 can include angled sides 1016 to urge, guide, and facilitate engagement with engagement member 1022, and the opening defined by angled sides may, according to certain aspects, be narrower than a diameter of the detent coupler bar of engagement member 1022. Further, engagement mechanism 1012 and engagement member 1022 can include complementary curved portions to provide a pivot joint when engaged. For example, when engagement mechanism 1012 and engagement member 1022 are engaged, the curved portions of engagement mechanism 1012 and engagement member 1022 can cooperate to provide relative rotational movement about the pitch (e.g., transverse) axis.

Figure 11A:
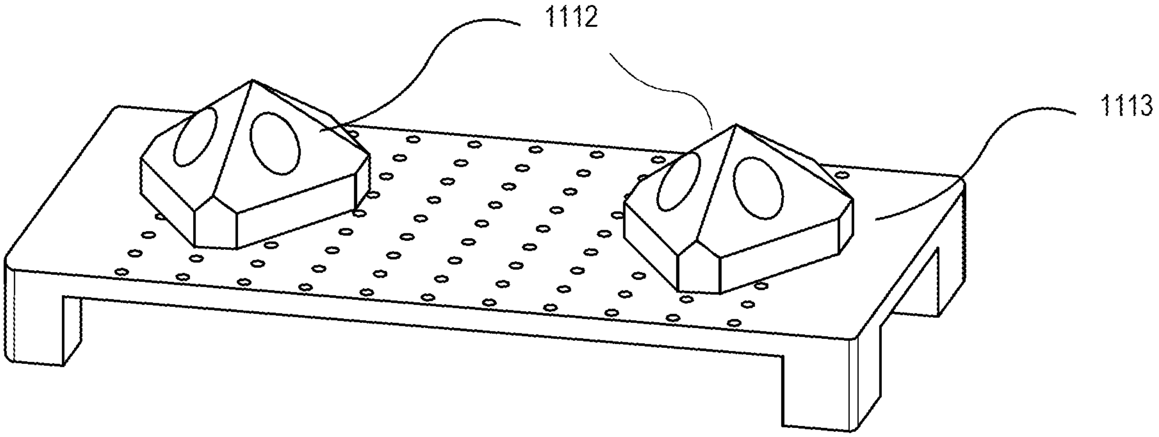
FIGS. 11A and 11B are illustrations of an exemplary engagement mechanism and engagement member, in accordance with embodiments of the present disclosure.
Figure 11B:
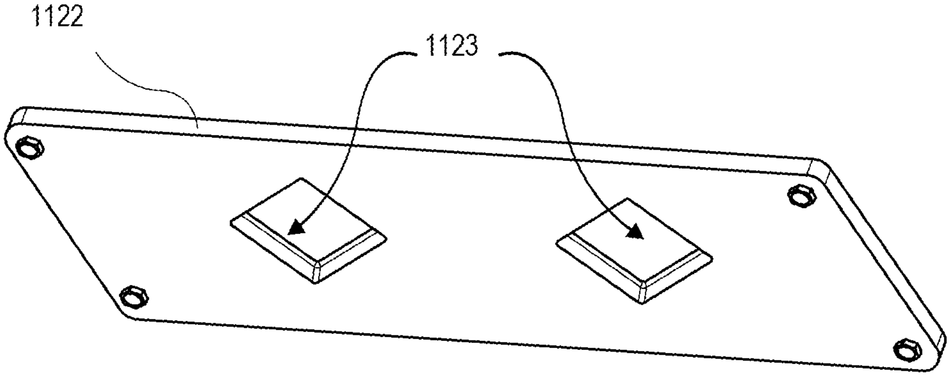

FIGS. 11A and 11B show yet another exemplary engagement mechanism and engagement member, in accordance with embodiments of the present disclosure. The engagement mechanism and engagement member shown in FIGS. 11A and 11B may, for example, be one exemplary implementation of engagement mechanism 112 and engagement member 212 shown in FIGS. 1A-1C, 3A, 3B, 4A, 4B, 5A, and 5B.

FIG. 11A shows engagement mechanism 1112 (e.g., of an autonomous vehicle such as autonomous vehicle 100), which may be configured to engage engagement member 1122 (e.g., of a payload carrier, such as payload carrier 200). According to aspects of the present disclosure, engagement mechanism 1112 may be coupled to a lift table or engagement plate of an autonomous vehicle and engagement member 1122 may be coupled to a base portion or undercarriage of a payload carrier. According to certain aspects, engagement member 1112 may be coupled to engagement plate 1113 that includes a pivot roll joint and/or a pivot pitch joint, so as to provide relative rotational movement about the roll (e.g., longitudinal) axis and/or the pitch (e.g., transverse) axis. In operation, engagement mechanism 1112 may be raised to provide releasable engagement with engagement member 1122.

As shown in FIGS. 11A and 11B, engagement mechanism 1112 can include pyramidal-shaped protrusions, and engagement member 1122 can include recesses 1123 configured to receive the pyramidal-shaped protrusions. For example, engagement mechanism 1112 can be received by and engage with recesses 1123 defined by engagement member 1122. Further, engagement member 1122 can include angled sides to urge, guide, and facilitate engagement with engagement mechanism 1112.

Figure 12A:
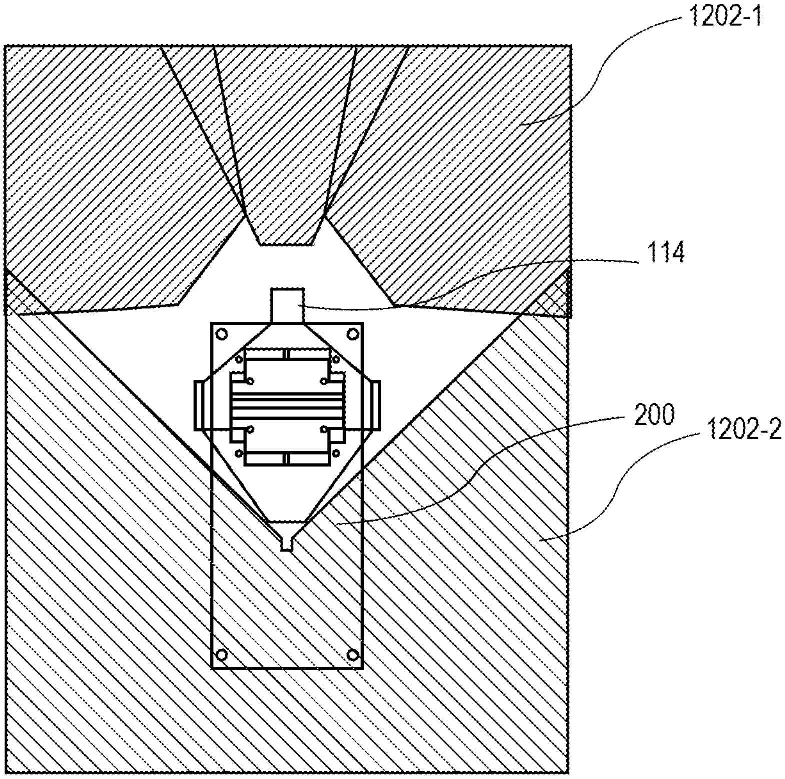
FIGS. 12A and 12B are line illustrations of exemplary field of views of sensors of an autonomous vehicle, in accordance with embodiments of the present disclosure.
Figure 12B:
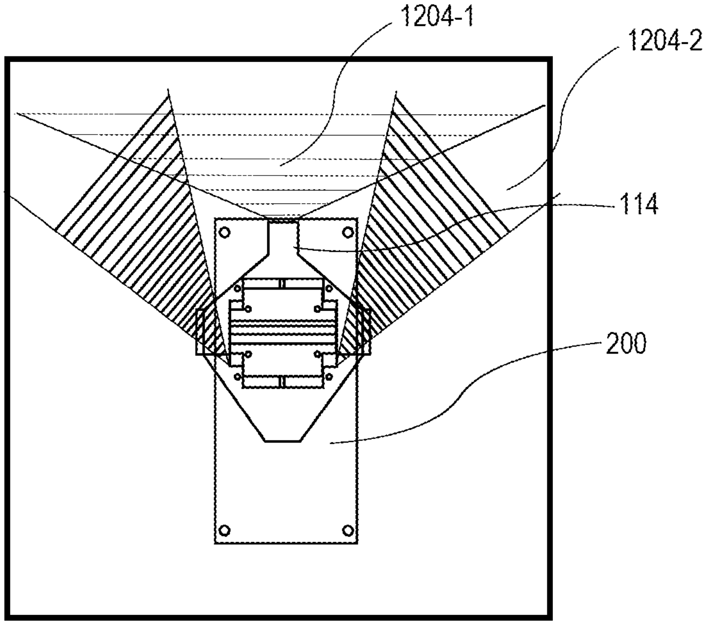

FIGS. 12A and 12B are illustrations of exemplary field of views of various sensors that may be coupled to an autonomous vehicle, according to embodiments of the present disclosure. For example, FIGS. 12A and 12B may illustrate exemplary field of views associated with sensors 118 coupled to autonomous vehicle 100.

As shown in FIG. 12A, in this configuration, extending portion 114 of chassis 108 of autonomous vehicle 100 extends beyond the periphery of payload carrier 200, so as to increase the field of view of any sensors disposed on extending portion 114. Accordingly, here, the front sensors can provide a nearly un-occluded view 1202-1 forward, and a rear sensor may provide view 1202-2, which may cover the sides and the rear.

FIG. 12A shows an exemplary field of view of sensors 118 disposed on extending portion 114, according to embodiments of the present disclosure. As shown in FIG. 12A, autonomous vehicle 100 may be positioned beneath payload carrier 200 in a position closer to one side of payload carrier 200. The illustration shown in FIG. 12A may dimensionally represent the configuration of autonomous vehicle 100 shown in FIGS. 3A, 4A, and 4B, where autonomous vehicle 100 is positioned beneath payload carrier 200 closer to one edge of payload carrier 200. According to aspects of the present disclosure, this engagement configuration may be preferred in implementations where autonomous vehicle 100 may be transporting payload carrier 200 in a longitudinal direction. As shown in FIG. 12A, extending portion 114 extends beyond a periphery of payload carrier 200 so as to reduce obstructions introduced by payload carrier 200 (e.g., ground supports 202, etc.) and increase field of views 1202-1 and 1202-2 of sensors 118 disposed on extending portion 114. Sensor 118 may include one or more imaging sensors, laser sensors (e.g., LIDAR, etc.), radar, etc. The sensor information obtained by sensor 118 can facilitate autonomous operation of autonomous vehicle 100 in unstructured, collaborative environments in various materials handling facilities (e.g., a sortation facility, a cross dock center, a fulfillment center, a warehouse, a delivery center, etc.).

FIG. 12B shows another exemplary field of view of sensors 118 disposed on autonomous vehicle 100, according to embodiments of the present disclosure. As shown in FIG. 12B, autonomous vehicle 100 may be positioned beneath payload carrier 200 in a position closer to one side of payload carrier 200. The illustration shown in FIG. 12B may dimensionally represent the configuration of autonomous vehicle 100 shown in FIGS. 3A, 4B, and 4C, where autonomous vehicle is positioned beneath payload carrier 200 closer to one edge of payload carrier 200. According to aspects of the present disclosure, this engagement configuration may be preferred in implementations where autonomous vehicle 100 may be transporting payload carrier 200 in a longitudinal direction. As shown in FIG. 12B, extending portion 114 may not extend beyond a periphery of payload carrier 200. Accordingly, sensors may be positioned on the sides of autonomous vehicle 100 so as to provide field of view 1204-2, which may supplement field of view 1204-1 provided by forward facing sensors 118 disposed on extending portion 114. Sensor 118 (as well as the sensors disposed on the side of autonomous vehicle 100 may include one or more imaging sensors, laser sensors (e.g., LIDAR, etc.), radar, etc. The sensor information obtained by sensor 118 can facilitate autonomous operation of autonomous vehicle 100 in unstructured, collaborative environments in various materials handling facilities (e.g., a sortation facility, a cross dock center, a fulfillment center, a warehouse, a delivery center, etc.). Further, one or more sensors may be disposed and positioned around autonomous vehicle 100 so as to limit occlusions presented by payload carrier 200 and facilitate operation of autonomous vehicle 100 with various types of payload carriers that may include different designs, components, etc., which may result in differing and varying occlusions to the field of view of autonomous vehicle 100.

FIGS. 13A and 13B are illustrations of exemplary payload carriers, according to embodiments of the present disclosure. The exemplary payload carriers shown in FIGS. 13A and 13B may be, for example, exemplary implementations of payload carrier 200 that autonomous vehicle 100 may engage and transport.

FIG. 13A shows exemplary payload carrier 1300, carrying payload 1310. Payload 1310 can include any materials to be transported by payload carrier 1300, such as packages, items, bins, totes, etc. As shown in FIG. 13A, payload carrier 1300 may be substantially rectangular, with a longitudinal dimension (represented by arrow L) that may be greater than a transverse dimension (represented by arrow T). Payload carrier 1300 may include ground supports 1302, casters 1304, and base or undercarriage 1308. Further, payload carrier 1300 may have one or more engagement members (e.g., engagement member 212, etc.) coupled to undercarriage 1308. Further, payload carrier 1300 may include a compliance mechanism (e.g., spring-loaded ground supports 1302, casters 1304, and/or engagement member, etc.) so as to form a joint for relative movement (e.g., about a pitch axis and/or a roll axis) between payload carrier 1300 and an engaged autonomous vehicle (e.g., autonomous vehicle 100).

In operation, an autonomous vehicle (e.g., autonomous vehicle 100, etc.) may position itself beneath payload carrier 1300. The autonomous vehicle may center itself (e.g., longitudinally, transversely, or both) beneath payload carrier 1300 or position itself closer to one edge of payload carrier 1300. The positioning of the autonomous vehicle may depend on the type of transport and/or an orientation of the engagement of the autonomous vehicle 100 with payload carrier 1300. For example, the autonomous vehicle 100 may center itself beneath payload carrier 1300 in instances where payload carrier 1300 is being transported transversely, and/or is being fully lifted or having the load of payload 1310 partially supported by the autonomous vehicle while remaining in full contact with the ground. Alternatively, the autonomous vehicle may position itself closer to one edge of payload carrier 1300 in instances where payload carrier 1300 is being transported longitudinally, and/or is being fully or partially lifted where certain castors 1304 may be lifted off the ground while other casters 1304 remain in contact with the ground.

After the autonomous vehicle has positioned itself beneath payload carrier 1300, the autonomous vehicle may engage payload carrier 1300 (e.g., engage undercarriage 1308 or an engagement member coupled to undercarriage 1308). Once payload carrier 1300 is engaged, it may be transported by the autonomous vehicle to the destination.

FIG. 13B shows exemplary payload carrier 1320 having enclosure 1330, which may be configured to carry a payload. The payload carried by payload carrier 1320 can include any materials to be transported by payload carrier 1320, such as packages, items, bins, totes, etc. As shown in FIG. 13B, payload carrier 1320 may be substantially rectangular, with a longitudinal dimension (represented by arrow L) that may be greater than a transverse dimension (represented by arrow T). Payload carrier 1320 may include ground supports 1322, casters 1324, and base or undercarriage 1328. Further, payload carrier 1320 may have one or more engagement members (e.g., engagement member 212, etc.) coupled to undercarriage 1328. Further, payload carrier 1320 may include a compliance mechanism (e.g., spring-loaded ground supports 1322, casters 1324, and/or engagement member, etc.) so as to form a joint for relative movement (e.g., about a pitch axis and/or a roll axis) between payload carrier 1300 and an engaged autonomous vehicle (e.g., autonomous vehicle 100).

In operation, an autonomous vehicle (e.g., autonomous vehicle 100, etc.) may position itself beneath payload carrier 1320. The autonomous vehicle may center itself (e.g., longitudinally, transversely, or both) beneath payload carrier 1320 or position itself closer to one edge of payload carrier 1320. The positioning of the autonomous vehicle may depend on the type of transport and/or an orientation of the engagement of the autonomous vehicle with payload carrier 1320. For example, the autonomous vehicle may center itself beneath payload carrier in instances where payload carrier 1320 is being transported transversely, and/or is being fully lifted or having the load of the payload carried by payload 1320 in enclosure 1330 partially supported by the autonomous vehicle while remaining in full contact with the ground. Alternatively, the autonomous vehicle may position itself closer to one edge of payload carrier 1320 in instances where payload carrier 1320 is being transported longitudinally, and/or is being fully partially lifted where certain castors 1324 may be lifted off the ground while other casters 1324 remain in contact with the ground.

After the autonomous vehicle has positioned itself beneath payload carrier 1320, the autonomous vehicle may engage payload carrier 1320 (e.g., engage undercarriage 1328 or an engagement member coupled to undercarriage 1328). Once payload carrier 1320 is engaged, it may be transported by the autonomous vehicle to the destination.

Figure 14:
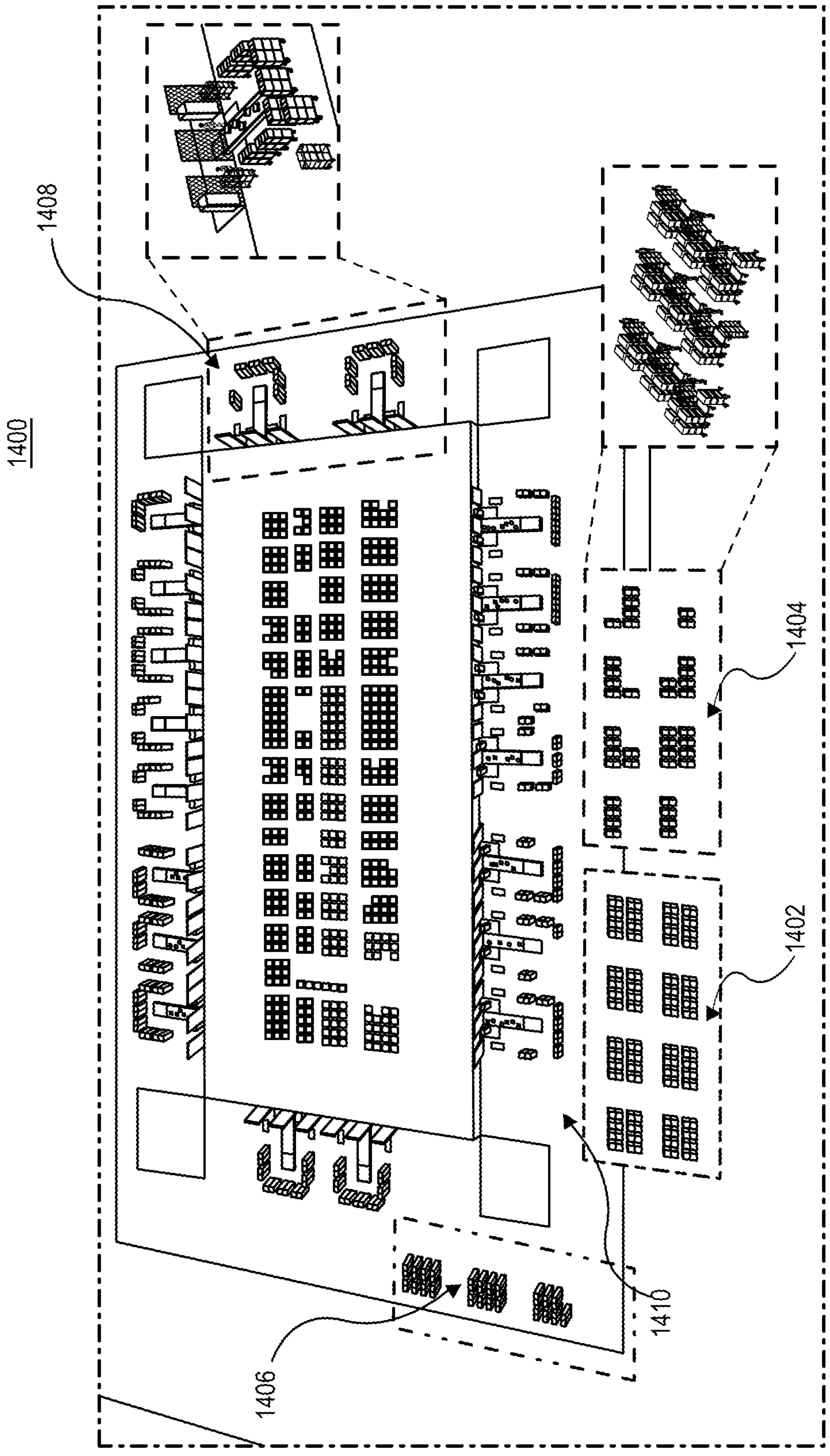
FIG. 14 is an illustration of an exemplary unstructured, collaborative materials handling facility environment, in accordance with embodiments of the present disclosure.

FIG. 14 is an illustration of an exemplary collaborative materials handling facility environment 1400 where the autonomous vehicles according to embodiments of the present disclosure may operate. As shown in FIG. 14, materials handling facility 1400 may include completed staging area 1402, active staging area 1404, payload carrier supply area 1406, workstation 1408, and lanes 1410. According to aspects of the present disclosure, the autonomous vehicles employed in materials handling facility 1400 may include, for example, autonomous vehicle 100, and the payload carriers employed in materials handling facility 1400 may include, for example, any of payload carrier 200, 1300, and/or 1320.

According to embodiments of the present disclosure, the autonomous vehicles may engage and transport the payload carriers between completed staging area 1402, active staging area 1404, payload carrier supply area 1406, and/or workstation 1408. According to certain aspects of the present disclosure, the autonomous vehicles may transport full payload carriers from workstation 1408 to active staging area 1404. In performing such a transport, the autonomous vehicle may first navigate to the payload carrier to be transported. Once it has arrived at the payload carrier to be transported, the autonomous vehicle may position itself beneath the payload carrier and engage the payload carrier. For example, since the retrieval of the payload carrier from workstation 1408 may be a low-speed, precision maneuver, the autonomous vehicle may center itself beneath the payload carrier and transport it transversely during retrieval from workstation 1408.

After the payload carrier has been retrieved from workstation 1408, the autonomous vehicle may disengage the payload carrier, reposition itself beneath the payload carrier, and re-engage the payload carrier. For example, the autonomous vehicle may position itself closer to one edge of the payload carrier to transport the payload carrier longitudinally. This may be preferred, for example, when transporting a payload carrier at relatively higher speeds over long distances (e.g., via lanes 1410). Once the autonomous vehicle arrives at active staging area 1404, the autonomous vehicle may once again disengage the payload carrier, reposition itself beneath the payload carrier (e.g., centered beneath the payload carrier), and engage the payload carrier to transport the payload carrier transversely to position the payload carrier at active staging area 1404. According to certain aspects, it may be preferable to transport the payload carrier in the transverse direction while positioning the payload carrier at active staging area 1404, as the payload carriers may be arranged in a dense configuration to conserve space and may require precise, low speed maneuvers.

According to another aspect of the present disclosure, the autonomous vehicles may transport empty payload carriers from payload carrier supply area 1406 to workstation 1408. In performing such a transport, the autonomous vehicle may first navigate to the payload carrier to be transported. Once it has arrived at the payload carrier to be transported, the autonomous vehicle may position itself beneath the payload carrier and engage the payload carrier. For example, since the retrieval of the payload carrier from payload carrier supply area 1406 may be a low-speed, precision maneuver (e.g., the empty payload carriers may be arranged in a dense configuration, etc.), the autonomous vehicle may center itself beneath the payload carrier and transport it transversely during retrieval from payload carrier supply area 1406.

After the payload carrier has been retrieved from payload carrier supply area 1406, the autonomous vehicle may disengage the payload carrier, reposition itself beneath the payload carrier, and re-engage the payload carrier. For example, the autonomous vehicle may position itself closer to one edge of the payload carrier to transport the payload carrier longitudinally. This may be preferred, for example, when transporting a payload carrier at relatively higher speeds over long distances (e.g., via lanes 1410). Once the autonomous vehicle arrives at workstation 1408, the autonomous vehicle may once again disengage the payload carrier, reposition itself beneath the payload carrier (e.g., centered beneath the payload carrier), and engage the payload carrier to transport the payload carrier transversely to position the payload carrier at workstation 1408. According to certain aspects, it may be preferable to transport the payload carrier in the transverse direction while positioning the payload carrier at workstation 1408, as precise, low speed maneuvers may be required.

Figure 15:
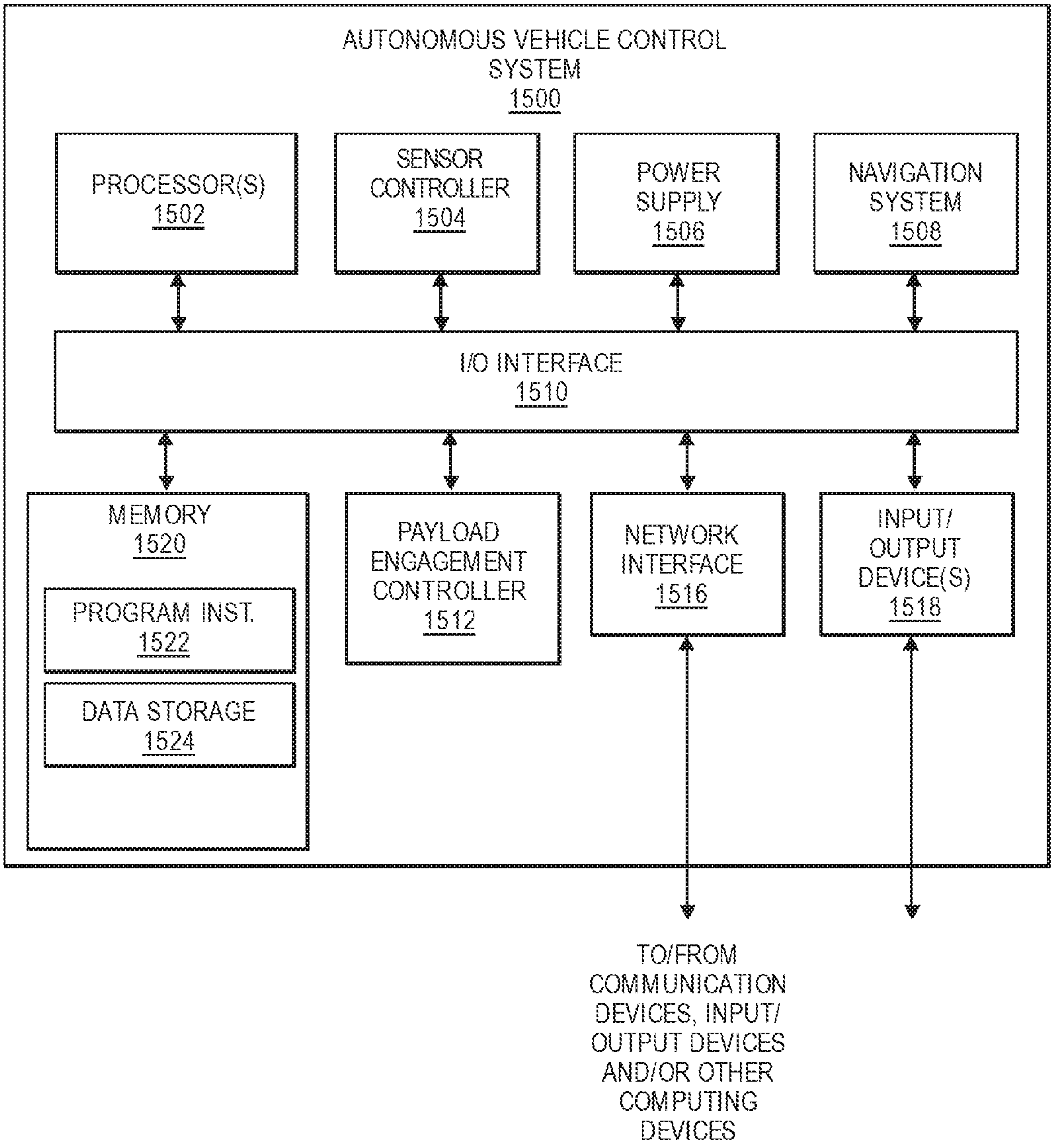
FIG. 15 is a block diagram of an exemplary autonomous vehicle control system, in accordance with embodiments of the present disclosure.

FIG. 15 is a block diagram illustrating various components of an exemplary autonomous vehicle control system 1500, in accordance with embodiments of the present disclosure.

In various examples, the block diagram may be illustrative of one or more aspects of autonomous vehicle control system 1500 that may be used to implement the various systems and methods discussed herein and/or to control operation of an autonomous vehicle discussed herein. In the illustrated implementation, autonomous vehicle control system 1500 includes one or more processors 1502, coupled to a memory, e.g., a non-transitory computer readable storage medium 1520, via input/output (I/O) interface 1510. Autonomous vehicle control system 1500 also includes sensor controller 1504, such imaging sensors, LIDAR, etc., power modules 1506, navigation system 1508, and/or payload engagement controller 1512. Autonomous vehicle control system 1500 further includes network interface 1516, and one or more input/output devices 1518.

In various implementations, autonomous vehicle control system 1500 may be a uniprocessor system including one processor 1502, or a multiprocessor system including several processors 1502 (e.g., two, four, eight, or another suitable number). Processor(s) 1502 may be any suitable processor capable of executing instructions. For example, in various implementations, processor(s) 1502 may be general-purpose or embedded processors implementing any of a variety of instruction set architectures (ISAs), such as the x86, PowerPC, SPARC, or MIPS ISAs, or any other suitable ISA. In multiprocessor systems, each processor 1502 may commonly, but not necessarily, implement the same ISA.

Non-transitory computer readable storage medium 1520 may be configured to store executable instructions, data, navigation routes, sensor information, occupancy maps, and/or data items accessible by processor(s) 1502. In various implementations, non-transitory computer readable storage medium 1520 may be implemented using any suitable memory technology, such as static random access memory (SRAM), synchronous dynamic RAM (SDRAM), nonvolatile/flash-type memory, or any other type of memory. In the exemplary embodiments, program instructions and data implementing desired functions, such as those described herein, are shown stored within non-transitory computer readable storage medium 1520 as program instructions 1522 and data storage 1524, respectively. In other implementations, program instructions, data, sensor information, occupancy maps, and/or controls may be received, sent, or stored upon different types of computer-accessible media, such as non-transitory media, or on similar media separate from non-transitory computer readable storage medium 1520 or autonomous vehicle control system 1500. Generally, a non-transitory, computer readable storage medium may include storage media or memory media such as magnetic or optical media, e.g., disk or CD/DVD-ROM, coupled to autonomous vehicle control system 1500 via I/O interface 1510. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via network interface 1516.

According to certain embodiments of the present disclosure, I/O interface 1510 may be configured to coordinate I/O traffic between processor(s) 1502, non-transitory computer readable storage medium 1520, and any peripheral devices, the network interface or other peripheral interfaces, such as input/output devices 1518. In some embodiments, I/O interface 1510 may perform any necessary protocol, timing or other data transformations to convert data signals from one component (e.g., non-transitory computer readable storage medium 1520) into a format suitable for use by another component (e.g., processor(s) 1502). In some embodiments, I/O interface 1510 may include support for devices attached through various types of peripheral buses, such as a variant of the Peripheral Component Interconnect (PCI) bus standard or the Universal Serial Bus (USB) standard, for example. In some embodiments, the function of I/O interface 1510 may be split into two or more separate components, such as a north bridge and a south bridge, for example. Also, in some implementations, some or all of the functionality of I/O interface 1510, such as an interface to non-transitory computer readable storage medium 1520, may be incorporated directly into processor(s) 1502.

Navigation system 1508 may include a global positioning system (GPS), indoor positioning system (IPS), or other similar system and/or sensors that can be used to navigate the autonomous vehicle to and/or from a location.

Network interface 1516 may be configured to allow data to be exchanged between autonomous vehicle control system 1500, other devices attached to a network, such as other computer systems (e.g., remote computing resources), and/or with autonomous vehicle control systems of other autonomous vehicle. For example, network interface 1516 may enable wireless communication between the autonomous vehicle and an autonomous ground vehicle control system that is implemented on one or more remote computing resources. For wireless communication, an antenna of the autonomous vehicle or other communication components may be utilized. As another example, network interface 1516 may enable wireless communication between numerous autonomous vehicles. In various implementations, network interface 1516 may support communication via wireless general data networks, such as a Wi-Fi network. For example, network interface 1516 may support communication via telecommunications networks, such as cellular communication networks, satellite networks, and the like.

Input/output devices 1518 may, in some exemplary embodiments, include one or more displays, imaging devices, thermal sensors, infrared sensors, time of flight sensors, accelerometers, pressure sensors, weather sensors, etc. Multiple input/output devices 1518 may be present and controlled by the autonomous vehicle control system 1500. One or more of these sensors may be utilized to implement the implementations described.

As shown in FIG. 15, the memory may include program instructions 1522, which may be configured to implement the exemplary routines and/or sub-routines described herein. Data storage 1524 may include various data stores for maintaining data items that may be provided for autonomous vehicle navigation, determining navigation routes, detecting objects, detecting object types, determining object dynamics, generating annotated reference maps, generating annotated images, generating semantic layers, generating semantic c-spaces, generating combined c-spaces, etc. In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Those skilled in the art will appreciate that autonomous vehicle control system 1500 is merely illustrative and is not intended to limit the scope of the present disclosure. In particular, the computing system and devices may include any combination of hardware or software that can perform the indicated functions. Autonomous vehicle control system 1500 may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with autonomous vehicle control system 1500. Some or all of the system components or data structures may also be stored (e.g., as instructions or structured data) on a non-transitory, computer-accessible medium or a portable article to be read by an appropriate drive, various examples of which are described herein. In some implementations, instructions stored on a computer-accessible medium separate from autonomous vehicle control system 1500 may be transmitted to autonomous vehicle control system 1500 via transmission media or signals such as electrical, electromagnetic, or digital signals, conveyed via a communication medium such as a wireless link. Various implementations may further include receiving, sending, or storing instructions and/or data implemented in accordance with the foregoing description upon a computer-accessible medium. Accordingly, the techniques described herein may be practiced with other autonomous vehicle control system configurations.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the flow charts shown in FIGS. 2 and 6, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A system, comprising:
a payload carrier including an engagement member;
an autonomous vehicle configured to engage the payload carrier from beneath the payload carrier in a first orientation and a second orientation, the autonomous vehicle being sized and dimensioned to perform full unobstructed rotations while positioned beneath the payload carrier and including:
a lift table configured to engage and disengage the payload carrier; and
an engagement mechanism coupled to the lift table and configured to engage the engagement member so as to releasably engage the autonomous vehicle to the payload carrier,
wherein:
in the first orientation, the autonomous vehicle is oriented to transport the payload carrier in a direction parallel to a longitudinal dimension of the payload carrier and the engagement mechanism engages the engagement member so as to form:
a pitch pivot joint that provides relative movement, during transport of the payload carrier by the autonomous vehicle, between the payload carrier and the autonomous vehicle about an axis transverse to the autonomous vehicle; and
a roll pivot joint that provides relative movement, during transport of the payload carrier by the autonomous vehicle, between the payload carrier and the autonomous vehicle about an axis longitudinal to the autonomous vehicle; and
in the second orientation, the autonomous vehicle is oriented to transport the payload carrier in a direction parallel to a transverse dimension of the payload carrier.

2. The system of claim 1, wherein:
the payload carrier includes a plurality of ground contacting supports; and
in the first orientation, the lift table lifts the payload carrier such that at least one of the plurality of ground contacting supports is lifted off a ground surface and at least another one of the plurality of ground contacting supports is in contact with the ground surface.

3. The system of claim 2, wherein:
in the second orientation:
the lift table lifts the payload carrier such that a portion of a force exerted by a payload disposed in the payload carrier is supported by the autonomous vehicle to provide traction to a drive wheel of the autonomous vehicle; and
each of the plurality of ground contacting supports is in contact with the ground surface.

4. The system of claim 1, wherein the engagement member is coupled to an undercarriage of the payload carrier at a first position closer to a first edge of the payload carrier, and in the first orientation, the autonomous vehicle is arranged at a second position closer to the first edge of the payload carrier.

5. The system of claim 1, wherein in the second orientation, the autonomous vehicle is centered relative to at least the longitudinal dimension of the payload carrier.

6. An autonomous vehicle for transporting a payload carrier, comprising:
at least one drive wheel;
a lift table configured to engage the payload carrier in a first engagement configuration; and
an engagement mechanism coupled to the lift table,
wherein in the first engagement configuration:
the engagement mechanism coupled to the lift table engages an engagement member of the payload carrier to form:
a pitch pivot joint that provides relative movement, during transport of the payload carrier by the autonomous vehicle, between the payload carrier and the autonomous vehicle about an axis transverse to the autonomous vehicle; and
a roll pivot joint that provides relative movement, during transport of the payload carrier by the autonomous vehicle, between the payload carrier and the autonomous vehicle about an axis longitudinal to the autonomous vehicle; and
the lift table lifts the payload carrier such that at least one of a plurality of ground supports of the payload carrier is lifted off a ground surface and at least another one of the plurality of ground supports is in contact with the ground surface.

7. The autonomous vehicle of claim 6, wherein in the first engagement configuration, the autonomous vehicle is oriented to transport the payload carrier in a direction parallel to a longitudinal dimension of the payload carrier.

8. The autonomous vehicle of claim 6 wherein the lift table is further configured to engage the payload carrier in a second engagement configuration, wherein in the second engagement configuration:
the lift table lifts the payload carrier such that the autonomous vehicle supports at least a portion of a force exerted by a payload disposed in the payload carrier so as to provide traction to the at least one drive wheel of the autonomous vehicle; and
each of the plurality of ground supports of the payload carrier is in contact with the ground surface.

9. The autonomous vehicle of claim 8, wherein in the second engagement configuration, the autonomous vehicle is oriented to transport the payload carrier in a direction parallel to a transverse dimension of the payload carrier.

10. The autonomous vehicle of claim 8, wherein in the second engagement configuration, a surface of the lift table engages an undercarriage of the payload carrier.

11. The autonomous vehicle of claim 6, wherein the engagement mechanism is formed in a coupling plate, and the coupling plate is coupled to the lift table via at least one spring.

12. The autonomous vehicle of claim 6, wherein the engagement mechanism includes a socket that is configured to engage a pin of the engagement member, and engagement of the pin and socket form the pitch pivot joint and the roll pivot joint.

13. The autonomous vehicle of claim 6, wherein, at least one of:
- the engagement mechanism includes a detent coupler that is configured to engage a detent coupler bar of the engagement member;
- the engagement mechanism includes a socket that is configured to engage a pin of the engagement member;
- the engagement mechanism includes a recess that is configured to engage a protrusion of the engagement member; or
- the engagement mechanism includes a pyramidal protrusion that is configured to engage a recess of the engagement member.

14. The autonomous vehicle of claim 8, further comprising:
- a chassis having an extending portion; and
- a plurality of sensors coupled to the extending portion such that in the first engagement configuration and the second engagement configuration, the plurality of sensors extend beyond a periphery of the payload carrier.

15. The autonomous vehicle of claim 8, wherein the lift table is further configured to engage the payload carrier in a third engagement configuration, and wherein in the third engagement configuration, the lift table lifts the payload carrier such that none of the plurality of ground supports is in contact with the ground surface.

16. An autonomous vehicle for transporting a payload carrier in an unstructured human collaborative environment, the autonomous vehicle comprising:
- a chassis;
- a plurality of sensors coupled to the chassis;
- a lift table configured to engage the payload carrier in a first engagement configuration and a second engagement configuration; and
- an engagement mechanism coupled to the lift table and configured to engage an engagement member of the payload carrier so as to releasably engage the autonomous vehicle to the payload carrier, wherein:
- in the first engagement configuration:
  - the autonomous vehicle is oriented to transport the payload carrier in a direction parallel to a longitudinal dimension of the payload carrier;
  - the plurality of sensors extends beyond a periphery of the payload carrier; and
  - the engagement mechanism engages the engagement member so as to form a pitch pivot joint that provides relative movement, during transport of the payload carrier by the autonomous vehicle, between the payload carrier and the autonomous vehicle in two degrees of movement about an axis transverse to the autonomous vehicle, and
- in the second engagement configuration:
  - the autonomous vehicle is oriented to transport the payload carrier in a direction parallel to a transverse dimension of the payload carrier; and
  - the plurality of sensors extends beyond a periphery of the payload carrier.

17. The autonomous vehicle of claim 16, wherein the chassis includes an extending portion and the plurality of sensors is disposed on the extending portion of the chassis.

18. The autonomous vehicle of claim 16, wherein the plurality of sensors includes at least one laser sensor and at least one imaging sensor.

19. The autonomous vehicle of claim 16, wherein:
- in the first engagement configuration, the lift table lifts the payload carrier such that at least one of a plurality of ground supports of the payload carrier is lifted off a ground surface and at least another one of the plurality of ground supports is in contact with the ground surface; and
- in the second engagement configuration, the lift table lifts the payload carrier such that the autonomous vehicle supports at least a portion of a force exerted by a payload disposed in the payload carrier so as to provide traction to at least one drive wheel of the autonomous vehicle and each of the plurality of ground supports of the payload carrier is in contact with the ground surface.

* * * * *